United States Patent
Ezrielev et al.

(10) Patent No.: US 12,282,577 B2
(45) Date of Patent: Apr. 22, 2025

(54) OPERATING A DATA PIPELINE BASED ON DATA PRIVACY REGULATIONS

(71) Applicant: Dell Products L.P., Round Rock, TX (US)

(72) Inventors: Ofir Ezrielev, Beer Sheva (IL); Hanna Yehuda, Acton, MA (US); Inga Sogaard, Wichita, KS (US)

(73) Assignee: Dell Products L.P., Round Rock, TX (US)

( * ) Notice: Subject to any disclaimer, the term of this patent is extended or adjusted under 35 U.S.C. 154(b) by 201 days.

(21) Appl. No.: 18/343,957

(22) Filed: Jun. 29, 2023

(65) Prior Publication Data

US 2025/0005183 A1    Jan. 2, 2025

(51) Int. Cl.
*H04L 29/06* (2006.01)
*G06F 21/62* (2013.01)

(52) U.S. Cl.
CPC .................... *G06F 21/6218* (2013.01)

(58) Field of Classification Search
CPC .......... G06F 21/6245; G06F 21/6218
See application file for complete search history.

(56) References Cited

U.S. PATENT DOCUMENTS

| | | | |
|---|---|---|---|
| 7,315,805 B2 | 1/2008 | Slater | |
| 10,168,691 B2 | 1/2019 | Zornio et al. | |
| 10,936,479 B2 | 3/2021 | Maag et al. | |
| 11,101,037 B2 | 8/2021 | Allen | |
| 11,221,270 B2 | 1/2022 | Evans | |
| 11,341,605 B1 | 5/2022 | Singh | |
| 11,853,853 B1 | 12/2023 | Beauchesne et al. | |
| 12,008,046 B1 | 6/2024 | Curtis et al. | |
| 12,242,447 B2 * | 3/2025 | Ezrielev | G06F 16/217 |
| 2004/0064750 A1 | 4/2004 | Conway | |
| 2006/0009881 A1 | 1/2006 | Ferber et al. | |
| 2014/0037161 A1 | 2/2014 | Rucker | |
| 2014/0136184 A1 | 5/2014 | Hatsek | |
| 2016/0098037 A1 | 4/2016 | Zornio | |

(Continued)

OTHER PUBLICATIONS

Wang, Haozhe, et al., "A graph neural network-based digital twin for network slicing management," IEEE Transactions on Industrial Informatics 18.2 (2020): 1367-1376 (11 Pages).

(Continued)

*Primary Examiner* — Jason K Gee
(74) *Attorney, Agent, or Firm* — WOMBLE BOND DICKINSON (US) LLP

(57) ABSTRACT

Methods and systems for managing operation of a data pipeline are disclosed. To manage operation of a data pipeline when a portion of data is inaccessible may require generating synthetic portion of data to generalize the inaccessible portion of data. Prior to the generation of the synthetic portion of data, an analysis of an intended use of the inaccessible portion of data may be performed. The analysis may reduce the likelihood of generation and use of synthetic portion of data that is unreliable. Once obtained, the synthetic portion of data may be analyzed to determine a likelihood that the synthetic portion of the data may successfully generalize the inaccessible portion of data. When the synthetic portion of data is determined to meet or exceed quality criteria, the synthetic portion of data may be utilized by the data pipeline.

20 Claims, 10 Drawing Sheets

(56) References Cited

U.S. PATENT DOCUMENTS

| | | | |
|---|---|---|---|
| 2018/0081871 A1 | 3/2018 | Williams | |
| 2019/0034430 A1 | 1/2019 | Das | |
| 2019/0236204 A1 | 8/2019 | Canim | |
| 2020/0166558 A1 | 5/2020 | Weis | |
| 2020/0167224 A1 | 5/2020 | Abali | |
| 2020/0202478 A1 | 6/2020 | Thumpudi et al. | |
| 2020/0293684 A1 | 9/2020 | Harris | |
| 2021/0027771 A1 | 1/2021 | Hall | |
| 2021/0116505 A1 | 4/2021 | Shu | |
| 2021/0374143 A1 | 12/2021 | Neill | |
| 2021/0385196 A1* | 12/2021 | Rahmat | H04L 63/0421 |
| 2021/0406110 A1 | 12/2021 | Vaid et al. | |
| 2022/0086175 A1* | 3/2022 | Bharrat | G06N 3/088 |
| 2022/0092234 A1 | 3/2022 | Karri | |
| 2022/0301027 A1 | 9/2022 | Basta | |
| 2022/0310276 A1 | 9/2022 | Wilkinson | |
| 2023/0040834 A1* | 2/2023 | Haile | G06F 16/26 |
| 2023/0090398 A1* | 3/2023 | Upadhyay | G06N 3/0475 705/44 |
| 2023/0126260 A1 | 4/2023 | Elsakhawy et al. | |
| 2023/0153095 A1 | 5/2023 | Rahill-Marier | |
| 2023/0213930 A1 | 7/2023 | Rakshit | |
| 2023/0315078 A1 | 10/2023 | Sepulveda et al. | |
| 2023/0418280 A1 | 12/2023 | Emery | |
| 2024/0235952 A9 | 7/2024 | Hicks | |
| 2024/0281419 A1 | 8/2024 | Alfaras | |
| 2024/0330136 A1 | 10/2024 | Furlong | |

OTHER PUBLICATIONS

Almasan, Paul, et al., "Digital Twin Network: Opportunities and challenges," arXiv preprint arXiv:2201.01144 (2022) (7 Pages).

Hu, Weifei, et al., "Digital twin: A state-of-the-art review of its enabling technologies, applications and challenges," Journal of Intelligent Manufacturing and Special Equipment 2.1 (2021): 1-34 (34 Pages).

Khan, Latif U., et al., "Digital-Twin-Enabled 6G: Vision, Architectural Trends, and Future Directions," IEEE Communications Magazine 60.1 (2022): 74-80 (7 Pages).

Nguyen, Huan X., et al., "Digital Twin for 5G and Beyond," IEEE Communications Magazine 59.2 (2021): 10-15. (12 Pages).

Wang, Danshi, et al., "The Role of Digital Twin in Optical Communication: Fault Management, Hardware Configuration, and Transmission Simulation," IEEE Communications Magazine 59.1 (2021): 133-139 (6 Pages).

Pang, Toh Yen, et al., "Developing a digital twin and digital thread framework for an 'Industry 4.0' Shipyard," Applied Sciences 11.3 (2021): 1097 (22 Pages).

Isto, Pekka, et al., "5G based machine remote operation development utilizing digital twin," Open Engineering 10.1 (2020): 265-272 (8 Pages).

Redick, William, "What is Outcome-Based Selling?" Global Performance, Web Page <https://globalperformancegroup.com/what-is-outcome-based-selling/> accessed on Feb. 14, 2023 (8 Pages).

"The Best Data Curation Tools for Computer Vision in 2022," Web Page <https://www.lightly.ai/post/data-curation-tools-2022> accessed on Feb. 14, 2023 (9 Pages).

Bebee, Troy et al., "How to detect machine-learned anomalies in real-time foreign exchange data," Google Cloud, Jun. 10, 2021, Web Page <https://cloud.google.com/blog/topics/financial-services/detect-anomalies-in-real-time-forex-data-with-ml> accessed on Feb. 14, 2023 (16 Pages).

Wang, Haozhe, et al., "A graph neural network-based digital twin for network slicing management," IEEE Transactions on Industrial Informatics 18.2 (2020): 1367-1376 (10 Pages).

* cited by examiner

OPERATING A DATA PIPELINE BASED ON DATA PRIVACY REGULATIONS

FIELD

Embodiments disclosed herein relate generally to data management. More particularly, embodiments disclosed herein relate to systems and methods to manage data using a data pipeline.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
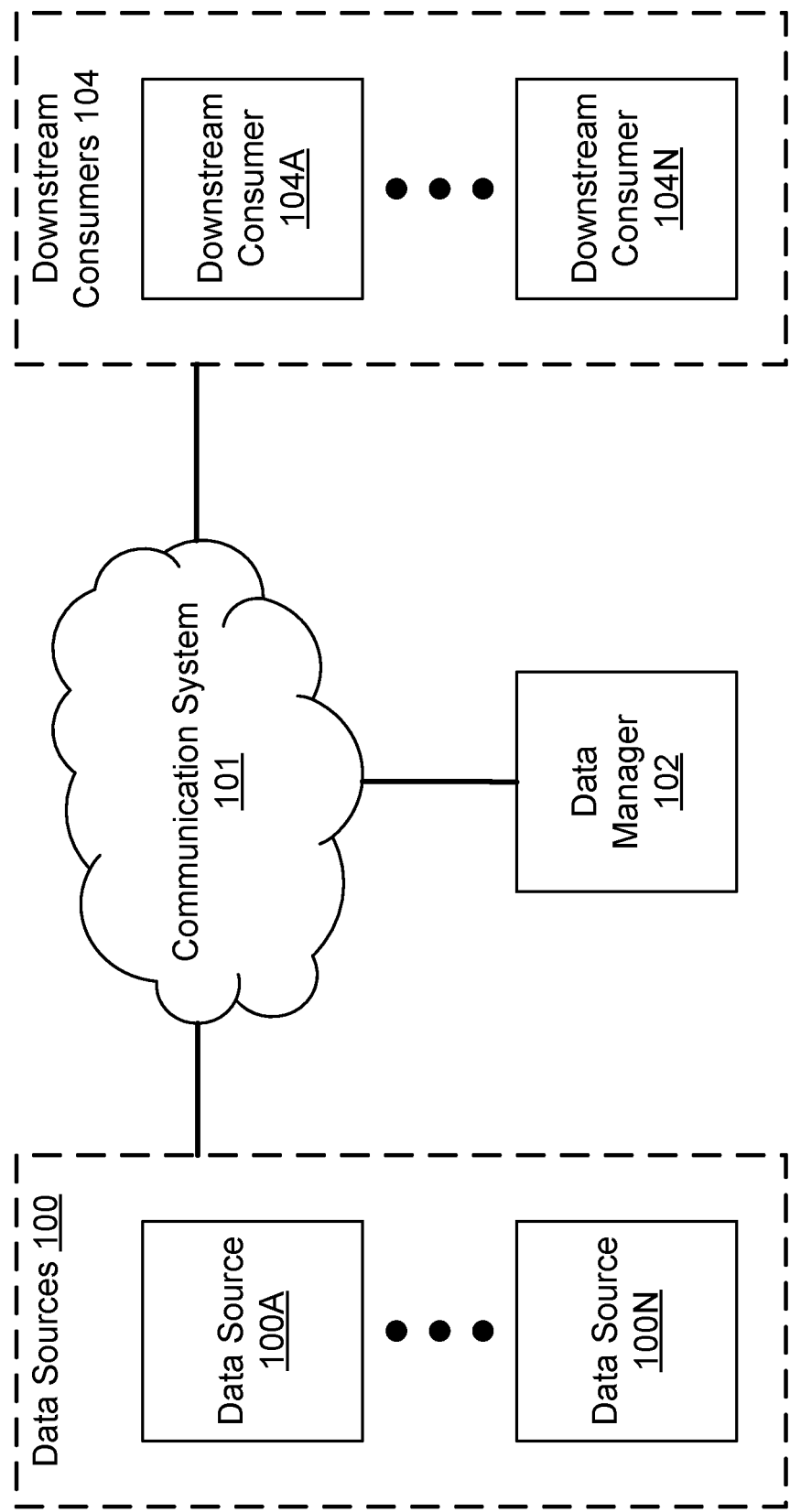
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of a data pipeline. A data pipeline may ingest raw data (e.g., unstructured data), transform the raw data into usable formats (e.g., as required by a destination data repository of the data pipeline), and store data (e.g., within a data repository) for use by downstream consumers. For example, downstream consumers may rely on the stored data to be accessible in order to provide computer-implemented services.

Managing operation of a data pipeline may include obtaining a request for data and/or determining the availability of the data. The data may be unavailable, for instance, if access to the data is restricted via a data manager or if the data is not obtainable from a data source. Access to the data may be restricted or not obtainable due to data privacy regulations (e.g., general data protection regulation (GDPR)) and/or other data regulatory frameworks. Data accessibility in a data pipeline may interrupt and/or hinder the performance of the data pipeline (e.g., via misalignment of application programming interfaces (APIs)) and, thereby, obstruct a downstream consumer to provide computer-implemented services based on the data.

The data pipeline may utilize one or more data processing systems to manage the operation of the data pipeline, which may include synthetic data generation when the data is determined to be inaccessible or limited to disclosure. Synthetic data generation may include using a trained inference model to generate synthetic data (e.g., prediction of the inaccessible data) for which may be implemented in the data pipeline when the requested data is inaccessible. For example, synthetic data generation may be implemented in order to provide synthetic data to a consumer when the requested data is inaccessible. By doing so, embodiments disclosed herein may provide a system for generating synthetic data when the data requested is inaccessible. The generation of synthetic data may reduce failures of the data pipeline (e.g., due to the inability to provide requested data) as a result of inaccessible data in the data pipeline.

However, the synthetic data generated by an inference model may only be useful to a consumer if the synthetic data is reliable. To increase the likelihood that the synthetic data will be reliable (e.g., successfully generalize the inaccessible data) for use by a consumer, the system may obtain quality ratings for the synthetic data prior to providing the synthetic data to the consumer. Quality ratings may indicate a likelihood that the synthetic data (e.g., the inference) may successfully generalize the data. A level of quality of the synthetic data (e.g., the quality rating) may be compared to a minimum acceptable level of quality (e.g., quality criteria as defined by the consumer) for the synthetic data. If the quality rating does not meet the quality criteria, the system may proceed to generate a data package using the accessible data and excluding the synthetic data in the data package (e.g., the synthetic data may not be provided). If the quality rating does meet the quality criteria, the system may initiate a process of obtaining a data package including the accessible data and the synthetic data to provide to the consumer. By doing so, reliability of the synthetic data may be increased while reducing failures of the data pipeline as a result of data inaccessibility.

In an embodiment, a method for managing operation of a data pipeline is provided. The method may include obtaining a request for data managed by the data pipeline; performing a screening process to identify a first portion of the data that is screened from a requestor of the data and a second portion of the data that is unscreened from the requestor; performing a downstream use analysis for the first portion of the data to determine whether a synthetic portion of the data should be generated; in a first instance of the downstream use analysis in which the synthetic portion of the data should be generated: obtaining an inference as a substitute for the first portion of the data, the inference being used as the synthetic portion of the data; performing a quality analysis of the synthetic portion of the data to ascertain whether the synthetic portion of the data is an acceptable substitute for the first portion of the data; in a first instance of the quality analysis where the synthetic portion of the data is the acceptable substitute for the first portion of the data: obtaining a data package using the second portion of the data and the synthetic portion of the data; in a second instance of the quality analysis where the synthetic portion of the data is not the acceptable substitute for the first portion of the data: obtaining the data package using the second portion of the data and excluding the synthetic portion of the data from the data package; and providing the data package to the requestor to service the request for the data.

The data may be subject to a data regulatory framework, the data regulatory framework indicating portions of the data that are restricted from being disclosed.

The screening process may be based on the data regulatory framework which may include data privacy regulations that discriminate the portions of the data with restricted access due to a sensitive nature of each of the portions of the data, the data privacy regulations may restrict access to the portions of the data.

The first portion of the data that is screened may be inaccessible by the requestor, and the second portion of the data that is unscreened may be accessible by the requestor after the data package is used to service the request.

Performing the screening process may include identifying characteristic of the data; and comparing the characteristic of the data to the data regulatory framework to determine whether the data may be subject to regulation or limitation for disclosure.

Performing the downstream use analysis may include: making a determination regarding whether an intended use of the first portion of the data meets sensitivity criteria, the sensitivity criteria being based on a degree to which the requestor relies on the first portion of the data to provide computer-implemented services; in a first instance of the determination in which the intended use of the first portion of the data meets the sensitivity criteria: identifying that the synthetic portion of the data should be generated and used as a substitute of the first portion of the data; and in a second instance of the determination in which the intended use of the second portion of the data does not meet the sensitivity criteria: identifying that the synthetic portion of the data should not be generated and used as the substitute of the first portion of the data.

Obtaining the inference may include generating, using an inference model and the second portion of the data, an inference and a quality rating for the inference, the inference being a generalization for the first portion of the data, and the quality rating indicating a likelihood that the inference accurately generalizes the first portion of the data.

The inference may not be usable by the requestor to discern the first portion of the data.

Performing the quality analysis may include: obtaining quality criteria for the synthetic portion of the data, the quality criteria indicating a minimum quality rating for the synthetic portion of the data; and making a comparison between the quality criteria and the quality rating of the synthetic portion of the data, wherein the quality criteria are defined by the requestor and the synthetic portion of the data is considered the acceptable substitute of the first portion of the data when the quality rating meets the quality criteria.

In the first instance of the quality analysis where the synthetic portion of the data is the acceptable substitute for the first portion of the data: obtaining the data package may include notifying the requestor that the first portion of the data has not been provided and has been substituted with the synthetic portion of the data.

In the second instance of the quality analysis where the synthetic portion of the data is not the acceptable substitute for the first portion of the data: obtaining the data package may include notifying the requestor that the first portion of the data has not been provided and that no acceptable substitute is available.

The method may also include in a second instance of the downstream use analysis in which the synthetic portion of the data should not be generated: obtaining the data package using the second portion of the data and excluding the first portion of the data from the data package; and providing the data package to the requestor to service the request for the data.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer-instructions are executed by the processor.

Turning to FIG. 1, a block diagram illustrating a system in accordance with an embodiment is shown. The system shown in FIG. 1 may provide computer-implemented services utilizing data obtained from any number of data sources and managed by a data manager prior to performing the computer-implemented services. The computer-implemented services may include any type and quantity of computer-implemented services. For example, the computer-implemented services may include monitoring services (e.g., of locations), communication services, and/or any other type of computer-implemented services.

To facilitate the computer-implemented services, the system may include data sources 100. Data sources 100 may include any number of data sources. For example, data sources 100 may include one data source (e.g., data source 100A) or multiple data sources (e.g., 100A-100N). Each data source of data sources 100 may include hardware and/or software components configured to obtain data, store data, provide data to other entities, and/or to perform any other task to facilitate performance of the computer-implemented services.

All, or a portion, of data sources 100 may provide (and/or participate in and/or support the) computer-implemented services to various computing devices operably connected to data sources 100. Different data sources may provide similar and/or different computer-implemented services.

For example, data sources 100 may include any number of personal electronic devices (e.g., desktop computers, cellphones, tablets, etc.), and/or any other devices operated by individuals to collect computing power measurements (e.g., storage capacity, processing power, etc.) of the devices for each individual. Data sources 100 may be associated with a data pipeline and, therefore, may collect the computing power measurements, may perform processes to sort, organize, format, and/or otherwise prepare the data for future processing in the data pipeline, and/or may provide the data to other data processing systems in the data pipeline (e.g., via one or more application programming interfaces (APIs)).

Data sources 100 may provide data to data manager 102. Data manager 102 may include any number of data processing systems including hardware and/or software components configured to facilitate performance of the computer-implemented services. Data manager 102 may include a database (e.g., a data lake, a data warehouse, etc.) to store data obtained from data sources 100 (and/or other entities throughout a distributed environment).

Data manager 102 may obtain data (e.g., from data sources 100), process the data (e.g., clean the data, transform the data, extract values from the data, etc.), store the data, and/or may provide the data to other entities (e.g., downstream consumer 104) as part of facilitating the computer-implemented services.

Continuing with the above example, data manager 102 may obtain the computing power measurements from data sources 100 as part of the data pipeline. Data manager 102 may obtain the computing power measurements via a request through an API and/or via other methods. Data manager 102 may curate the computing power measurements (e.g., identify errors/omissions and correct them, etc.) and may store the curated computing power measurements temporarily and/or permanently in a data lake or other storage architecture. Following curating the computing power measurements, data manager 102 may provide the computing power measurements to other entities for use in performing the computer-implemented services.

Data managed by data manager 102 (e.g., stored in a data repository managed by data manager 102, obtained directly from internet of things (IoT) devices managed by data manager 102, etc.) may be provided to downstream consumers 104. Downstream consumers 104 may utilize the data from data sources 100 and/or data manager 102 to provide all, or a portion of, the computer-implemented services. For example, downstream consumers 104 may provide computer-implemented services to users of downstream consumers 104 and/or other computing devices operably connected to downstream consumers 104.

Downstream consumers 104 may include any number of downstream consumers (e.g., 104A-104N). For example, downstream consumers 104 may include one downstream consumer (e.g., 104A) or multiple downstream consumers (e.g., 104A-104N) that may individually and/or cooperatively provide the computer-implemented services.

All, or a portion, of downstream consumers 104 may provide (and/or participate in and/or support the) computer-implemented services to various computing devices operably connected to downstream consumers 104. Different downstream consumers may provide similar and/or different computer-implemented services.

Continuing with the above example, downstream consumers 104 may utilize the computing power measurements from data manager 102 as input data for computing performance models. Specifically, downstream consumers 104 may utilize the computing power data to simulate future computing power conditions or requirements for individuals and/or entities over time (e.g., to predict potential improvements and/or increases in computing power).

However, the ability of downstream consumers 104 to provide (and/or participate in and/or support the) computer-implemented services may depend on the availability of the data (e.g., access to the data). In some instances, a portion of the data may be unavailable (e.g., not accessible) to downstream consumers 104 based on a break in communication (e.g., due to misalignment of an API), for example, between data sources 100 and data manger 102, resulting in a lack of data available via data manger 102.

For example, the data requested by downstream consumers 104 may include portions of data not accessible via data manager 102 due to, for example, a restriction or limitation of disclosure associated with the type of data requested from data sources 100. Data sources 100 may be unable to service a request for data (e.g., provide the data to data manager 102) due to communication break down between data sources 100 and data manager 102 (e.g., restrictions or limitations to disclose the data to data manager 102), and/or any other issues that may impede the ability to provide the data to data manager 102. If data sources 100 are unable to provide the requested data to data manager 102, data manager 102 may not be able to provide the requested data to the requestor (e.g., downstream consumers 104) resulting in a misalignment of the data pipeline and, therefore, an unexpected interruption to the computer-implemented services provided based on the data.

In addition, in some instances, a portion of the requested data may be inaccessible to the requestor (e.g., downstream consumers 104) based on a break in communication (e.g., due to misalignment of an API), for example, between data manager 102 and downstream consumers 104, resulting in an inability to provide data via data manager 102 (e.g., unable to service the request for data). For example, the data requested by downstream consumers 104 may include portions of data subject to regulatory restrictions that hinder the disclosure of the data (e.g., via data manager 102) to downstream consumers 104.

In general, embodiments disclosed herein may provide methods, systems, and/or devices for remediating misalignment of the data pipeline due to inaccessibility of data (e.g., based on regulatory restrictions associated with the data) used to provide computer-implemented services. To do so, the system of FIG. 1 may utilize one or more data regulatory frameworks to identify portions of the requested data with restricted access or that may be subject to limitation of disclosure, and may generate synthetic data (e.g., non-real data) based on the requested data (and/or any accessible data) and provide the synthetic data to other data processing systems associated with the data pipeline (e.g., downstream consumers 104, and/or other entities) to facilitate the utilization of data for the computer-implemented services.

Additionally, the ability of downstream consumers 104 to provide accurate computer-implemented services using the synthetic data may depend on the sensitivity of the downstream use of the inaccessible portion of data (e.g., for which the synthetic data is being generated as a substitute). If the intended use of the inaccessible portion data by the requestor is highly sensitive to reliability of the requested data, then synthetic data (e.g., any non-real data) may not be useful to generate and provide to the requestor (e.g., downstream consumers 104) in order to facilitate successful or accurate computer-implemented services.

To determine the sensitivity of the downstream use of the inaccessible portion of data, the intended use (e.g., as specified by the requestor) for the inaccessible portion of data may be compared to sensitivity criteria, the sensitivity criteria being based on a degree to which the requestor relies on the inaccessible portion of data to provide computer-implemented services. If the intended use does not meet the sensitivity criteria, the inaccessible portion of the data may not be provided to the requestor (e.g., downstream consumer 104 and/or other requesting entities). By doing so, a likelihood of disadvantageous or ineffectual generalizations being generated (e.g., by an inference model) may be reduced. As such, utilization of computing resources may be reduced and downstream consumers 104 may be able to identify instances when computer-implemented services require a level of accuracy (and/or other characteristics) for which the imputed data is insufficient.

Additionally, the ability of downstream consumers 104 to provide accurate computer-implemented services using the synthetic data may depend on the reliability and/or other characteristics of the synthetic data. If the synthetic data provided to downstream consumers 104 is not reliable, then downstream consumers 104 may generate inaccurate generalizations leading to unsuccessful or unhelpful computer-implemented services.

To determine reliability of the synthetic data, quality ratings for the synthetic data may be compared to quality criteria that provides a minimum acceptable level (e.g., rating) of quality for the synthetic data. The quality criteria may include any number of ratings, other parameters, etc. that may quantify a minimum standard of quality. Synthetic data that does not meet the quality criteria may not be provided to the requestor (e.g., downstream consumers 104 and/or other requesting entities). By doing so, the likelihood that unreliable or inaccurate synthetic data may be provided to the requesting entities (e.g., downstream consumers 104) may be reduced. As such, downstream consumers 104 may be more likely to provide accurate computer-implemented services when the data is inaccessible from data sources 100, for example.

To perform the above noted functionality, the system of FIG. 1 may: (i) obtain a request for data managed by the data pipeline, (ii) perform a screening process to identify portions of the data that is screened (e.g., inaccessible) and/or unscreened (e.g., accessible), and/or (iii) perform a downstream use analysis for the portion(s) of the data that are screened (and/or identified as inaccessible) to determine whether a synthetic portion of the data should be generated. If it is determined that the synthetic portion of the data should be generated, the system of FIG. 1 may: (i) obtain an inference as a substitute for the inaccessible portion of data, (ii) perform a quality analysis of the synthetic portion of the data, and/or (iii) determine whether the synthetic portion of the data is an acceptable substitute for the inaccessible portion of data. If the synthetic portion of the data is determined to be an acceptable substitute for the inaccessible portion of data, the system of FIG. 1 may obtain a data package using the accessible portion of the data and the synthetic portion of the data and provide the data package to the requestor to service the request for the data. If the synthetic portion of the data is determined to not be an acceptable substitute for the inaccessible portion of data, the system of FIG. 1 may obtain a data package using the accessible portion of the data and excluding the synthetic portion of the data from the data package and provide the data package to the requestor to service the request for the data.

When performing its functionality, data sources 100, data manager 102, and/or downstream consumers 104 may perform all, or a portion, of the methods and/or actions shown in FIGS. 2A-3C.

Data sources 100, data manager 102, and/or downstream consumers 104 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

In an embodiment, one or more of data sources 100, data manager 102, and/or downstream consumers 104 are implemented using an internet of things (IoT) device, which may include a computing device. The IoT device may operate in accordance with a communication model and/or management model known to data sources 100, data manager 102, downstream consumers 104, other data processing systems, and/or other devices.

Any of the components illustrated in FIG. 1 may be operably connected to each other (and/or components not illustrated) with a communication system 101. In an embodiment, communication system 101 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, diagrams illustrating data flows implemented by a system over time in accordance with an embodiment are shown in FIGS. 2A-2E.

Figure 2A:
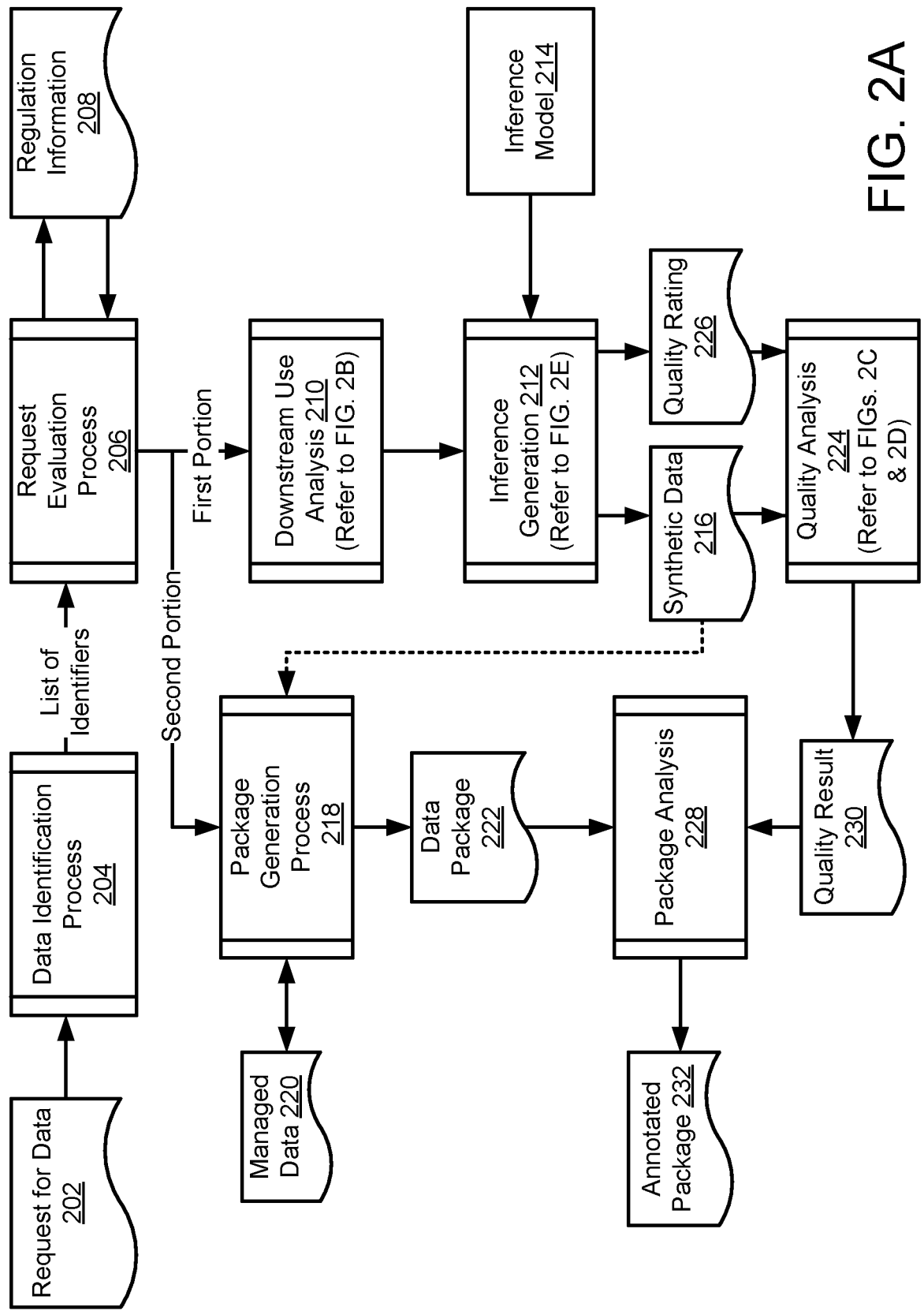
FIG. 2A shows a data flow diagram illustrating a process of remediating data inaccessibility in accordance with an embodiment.

Turning to FIG. 2A, a first data flow diagram illustrating data flows during remediation of data inaccessibility by the system of FIG. 1 in accordance with an embodiment is shown.

As discussed above, one or more data sources 100, data manager 102, and/or downstream consumers 104 (shown in FIG. 1) may form (fully or in part) a data pipeline in which data may be collected, processed, stored, shared and/or otherwise prepared for providing to other data processing systems to service a request for the data. In some instances, the data may be inaccessible due to a break in communication between one of the data processing systems of the data pipeline.

In order to manage operation of a data pipeline, the system may obtain request for data 202 from downstream consumer 104 (and/or any other requesting entity). Request for data 202 may include a request for portions of data in which the requestor (e.g., downstream consumer 104) is interested. In addition, request for data 202 may include an identifier such as metadata, device identifier, and/or other types of information associated with the requestor (e.g., downstream consumer 104) thereby identifying the individual, entity, and/or data processing system (e.g., inference model associated with the data pipeline) requesting the data.

After request for data 202 is obtained, data identification process 204 may be performed, using the requested data (e.g., as specified by request for data 202), to identify different portion(s) of the requested data. Data identification process 204 may include generating, based on request for data 202, a list of identifiers associated with the requested data. The list of identifiers may include one or more characteristics of the portion(s) of data responsive to the request, the type of each portion(s) of data responsive to the request, and/or any other identification of the portion(s) of data responsive to the data request (e.g., request of data 202). For example, request for data 202 may include a request for different types of data (e.g., locational data, financial data, etc.) which may be identified via data identification process 204.

Once the list of identifiers (e.g., associated with the requested data) is obtained, the list of identifiers may be evaluated with respect to accessibility of the different types of data. For example, in some instances, the requested data may include a type of data (e.g., personal data) that may be inaccessible, for example, due to a restriction or limitation for disclosure of the data (e.g., due to a data privacy regulation).

To determine whether a portion of the requested data may be subject to a restriction or limitation for disclosure (e.g., not accessible) to a requestor, request evaluation process 206 may be performed. Request evaluation process 206 may identify, using the list of identifiers (e.g., generated via data identification process 204), portion(s) of the requested data that may be subject to regulation, for example, as provided by regulation information 208. Regulation information 208 may specify relationships between different types of data and regulations that may limit disclosure or restrict access to the data, as well as relationships between requestors and different entities which may be restricted from accessing certain portion(s) of data. For example, request evaluation process 206 may include screening the list of identifiers associated with the requested data to determine whether any portion(s) of the data are subject to a regulation or limitation for disclosure (e.g., not accessible).

Regulation information 208 may include one or more data structures (not shown in FIG. 2A). The data structure(s) may include one or more data regulatory frameworks that provide a set of regulations or rules to follow for portion(s) of data (e.g., due to, for example, the sensitive nature of the data). The set or regulations or rules (e.g., provided by the one or more data regulatory frameworks) may be subject to geographical locations associated with requests for data as well as the geographic location (and/or other characteristics) of the requestor. For example, regulation information 208 may include regulations related to data privacy (e.g., such as General Data Protection Regulation (GDPR), Health Insurance Portability and Accountability Act (HIPAA), etc.) that discriminate portion(s) of data with restricted access due to a sensitive nature of the portion(s) of data.

To identify inaccessible portion(s) of the requested data, request evaluation process 206 may include obtaining information regarding data regulations and limitations (e.g., regulation information 208) which may be stored, for example, in a data repository (not shown). Each portion of the requested data may be evaluated (e.g., designated an accessibility value) based on data regulations and limitations by using the characteristic, type, and/or any other identification of the requested data (e.g., as specified by list of identifiers). Request evaluation process 206 may be performed by comparing the list of identifiers associated with the requested data to regulation information 208 (e.g., list of regulations or limitations associated with portions of data).

During request evaluation process 206, the system may indicate any different delineations between the list of identifiers associated with the requested data (e.g., request for data 202) and the data regulations (e.g., regulatory information 208). The delineations may define two portions of the requested data: a first portion of the requested data being screened (e.g., not accessible) from the requestor, and a second portion of the requested data being unscreened (e.g., accessible) by the requestor. The first portion of the requested data may indicate a portion of the requested data is subject to a regulation or limitation for disclosure based on regulation information 208. For example, the system may determine that one of the identifiers (e.g., via the list of identifiers) for a portion of the requested data is associated with one of the regulations or limitations identified via regulation information 208, and as such the system may determine that the portion of data may be inaccessible (e.g., subject to restricted access or limitation for disclosure) to the requestor.

The second portion of the requested data may indicate a portion of the requested data is not subject to a regulation or limitation for disclosure based on regulation information 208. For example, the system may determine that one of the identifiers (e.g., via the list of identifiers) for a portion of the requested data is not associated with any of the regulations or limitations identified via regulation information 208. As such the system may determine that the portion of data may be accessible (e.g., not subject to restricted access or limitation for disclosure) to the requestor.

For example, a company may sell computing devices and/or peripherals (e.g., computer mouses, keyboards, webcams, etc.) to individuals or entities that may utilize computing devices and/or peripherals to perform a task. The company may market certain computing devices and/or peripherals to individuals and/or entities based on specific parameters such as an individual's and/or entity's area of interest (e.g., intended use of devices such as for art, science, and/or any other fields of endeavors), computing requirements (e.g., storage and/or memory performance), etc. For example, the company may market graphics cards to entities and/or individuals interested in photography and/or any activity requiring high quality visual display. As such, the company may request data relating to various types of data for an individual and/or entities such as browsing history, recent purchases, sector of interest, personnel quantity, etc. in order to determine what computing devices and/or peripherals to market to the individual and/or entity.

In some instances, the company may request data for individuals and/or entities that are subject to different data regulatory standards which may limit or restrict access to some portions of data. For example, data for individuals and/or entities that are citizens of a country in the European Union may be protected under the General Data Protection Regulation (GDPR) and some portions of data for those citizens may be limited for disclosure to an individual and/or entity operating in a country or region not subject to the GDPR.

In some instances, an individual protected under certain data regulatory restrictions may travel to another country that operates under different data regulatory restrictions. For example, an individual that is a citizen of a European Union country (e.g., following GDPR) may travel to another country not operating under the GDPR (e.g., United States of America). Continuing the example above, the company may utilize certain types of data regarding individuals and/or entities that may be subject to different data regulatory restrictions based on the individual's and/or entities' data privacy protection. For instance, the company may request data regarding an individual's name, age, location, browsing history, electronic mail address, area of occupation or area of educational studies, etc. in order to determine what computing device and/or peripheral device to market to the individual.

In some instances, some portions of the data requested (e.g., individual's name, age, browsing history, electronic mail address, etc.) may be accessible (e.g., second portion of the requested data) to the requestor if the data is determined to not be subject to a restriction or limitation for disclosure, for example, based on data regulations (e.g., regulation information 208) pertaining to the individual for whom the data is being requested. For example, the company may receive access to an individual's personal data such as name, age, location, electronic mail address, etc.) when data regulations for the individual does not restrict or limit access to personal data.

In some instances, the data requested may be inaccessible (e.g., first portion of the requested data) to the requestor if the data is determined to be subject to a restriction or limitation for disclosure, for example, based on data regulations (e.g., regulation information 208) pertaining to the individual for whom the data is being requested. For example, the company may not receive access to an individual's personal data such as name, age, location, electronic mail address, etc. when the data regulations for the individual indicates restrictions or limitations for disclosure of personal data. Therefore, portion(s) of the requested data identified as subject to a regulation or limitation for disclosure (e.g., first portion of the requested data) may not be provided to the requestor (e.g., the company providing and/or selling computing devices and/or peripheral devices), resulting in a break in communication of an API, for example, between the requestor and the individual.

In order to remediate operation of the data pipeline due to a portion of the requested data being inaccessible (e.g., due to the data being subject to regulatory restrictions), the system may perform inference generation 212 to generate an inference (e.g., synthetic data 216) for the inaccessible portion of data (e.g., portion of data subject to a regulation or limitation for disclosure). In some instances, the portion of requested data that is inaccessible (e.g., due to restricted access) may be highly sensitive (e.g., heavily relied upon) to the downstream use (e.g., intended use) of the data by the requestor. Continuing the above example, the company may determine which computing device and/or peripheral device to market to individuals and/or entities based on a likelihood that the individuals and/or entities are more likely to use the devices and/or equipment. For instance, the company may rely on an individual's area of occupation (e.g., such as photography) to determine which individuals to market higher quality graphic cards, for example.

To determine whether an inference (e.g., synthetic data 216) should be generated and used as a substitute for the portions of requested data that are screened (e.g., first portion of the requested data), downstream use analysis 210 may be performed. Downstream use analysis 210 may include identifying whether generating and providing an inference (e.g., synthetic data 216) would be beneficial (or useful) for the requestor (e.g., downstream consumer 104) based on a degree to which the inaccessible portions of data may be relied on by the requestor in order to provide computer-implemented services.

Figure 2B:
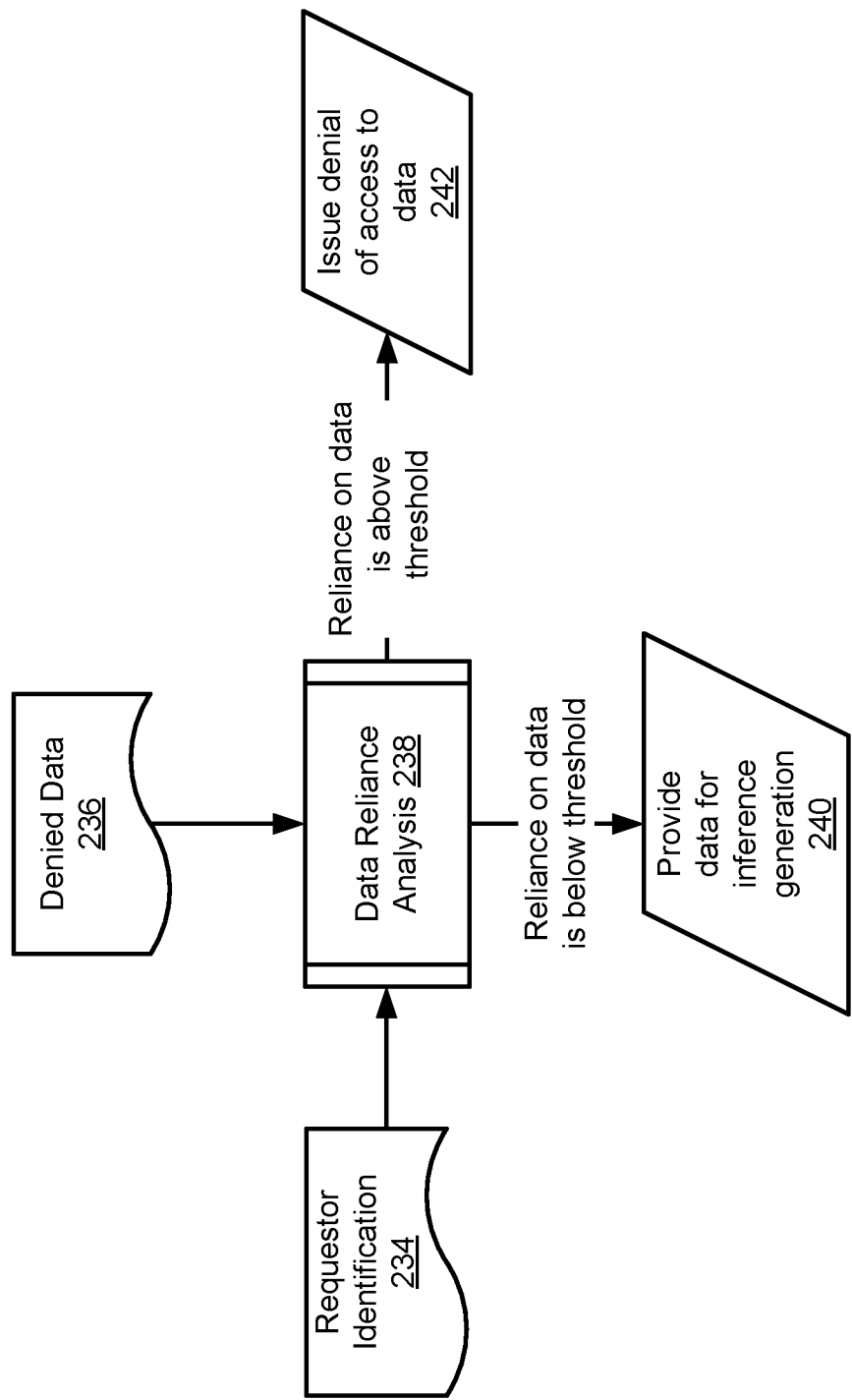
FIG. 2B shows a data flow diagram illustrating a process of analyzing downstream use of inaccessible data in accordance with an embodiment.

Downstream use analysis 210 process may be performed by evaluating whether an intended use of the first portion of the requested data (e.g., inaccessible portions of the data) meets the sensitivity criteria (not shown). The intended use of the first portion of the requested data may obtained from the requestor (e.g., downstream consumer 104) as a part of the request for data (e.g., request for data 202). The intended use may indicate a level of reliance of the first portion of the data by the requestor when the requestor is providing computer-implemented services. Sensitivity criteria may indicate a degree to which the requestor relies on the first portion of the requested data to provide computer-implemented services. Continuing the example described above, the company may rely on certain portions of data (e.g., individual's age, area of interest, browsing history, location, etc.) to determine what computing device and/or peripheral device may be more useful and/or may more likely be purchased by the individual. Refer to FIG. 2B for additional details regarding performing downstream use analysis.

In some instances, the system may determine (e.g., via downstream use analysis 210) that the intended use of the first portion of the requested data does not meet the sensitivity criteria and as such, the system may not proceed in generating an inference (e.g., synthetic data 216) for the first portion of the requested data (e.g., the inaccessible portion(s) of requested data).

In some instances, the system may determine (e.g., via downstream use analysis 210 process) that the intended use of the first portion of the requested data does meet the sensitivity criteria and as such, inference generation 212 process may be initiated. The system may perform inference generation 212 process to generate an inference (e.g., synthetic data 216) and a quantitative rating (e.g., quality rating 226) for the first portion of the requested data (e.g., as identified via request evaluation process 206).

Figure 2C:
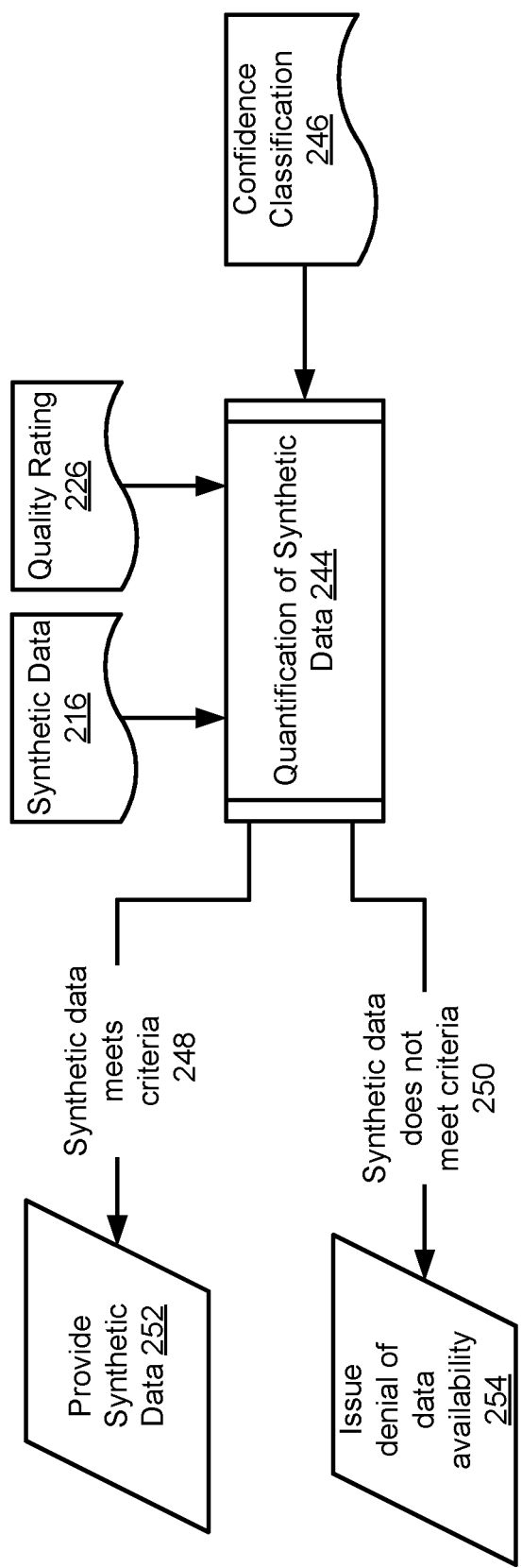
FIG. 2C shows a data flow diagram illustrating a process of quantifying synthetic data when data inaccessibility occurs by the system of FIG. 1 in accordance with an embodiment.
Figure 2D:
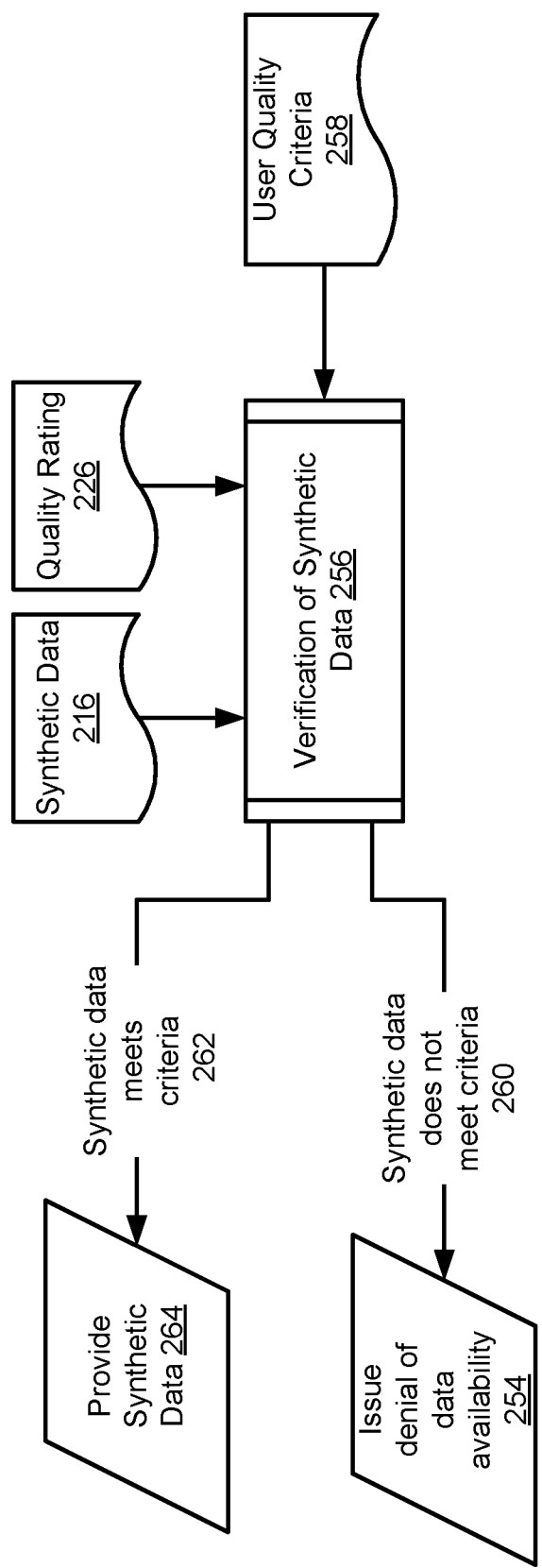
FIG. 2D shows a data flow diagram illustrating a process of verifying synthetic data when data inaccessibility occurs by the system of FIG. 1 in accordance with an embodiment.
Figure 2E:
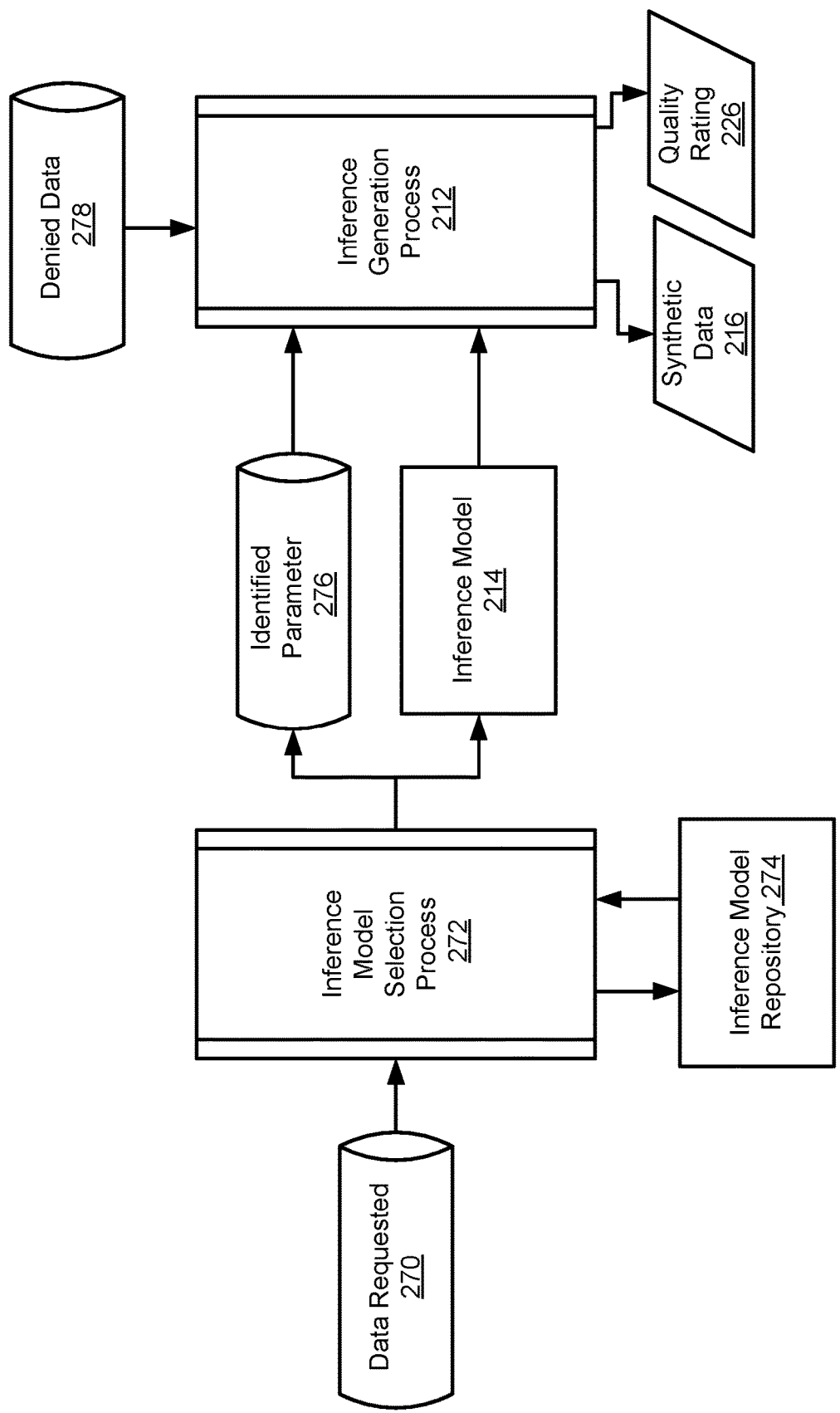
FIG. 2E shows a data flow diagram illustrating a process of generating synthetic data when data inaccessibility occurs by the system of FIG. 1 in accordance with an embodiment.

During inference generation 212 process, inference model 214 may be obtained. Inferences (e.g., synthetic data 216) may be obtained using inference model 214. Inference model 214 may be any type of inference model (e.g., a neural network inference model) and may be trained to generate inferences (e.g., as part of inference generation 212) indicating generalized data when the portion(s) of requested data are inaccessible or screened from the requestor (e.g., via regulation information 208). Refer to FIG. 2E for additional details regarding selecting an inference model.

Synthetic data 216 and quality rating 226 may be obtained by inference model 214 ingesting the second portion of the requested data (e.g., accessible portion of data identified via request evaluation process 206), an identifier (e.g., metadata, device identifier, and/or other types of information associated with the requestor, and/or any other information associated with the requested data (e.g., as specified by request for data 202). Synthetic data 216 may indicate a generalization for the inaccessible portion(s) of data requested and quality rating 226 of the generalized data (e.g., synthetic data 216) may indicate a probability of accuracy that the generalized data (e.g., synthetic data 216) successfully generalizes the first portion of the data (e.g., the inaccessible portion of the data). Quality rating 226 may include any information regarding a degree to which the inference accurately generalizes the inaccessible or screened portion of the requested data. For example, synthetic data 216 may include a generalization of the first portion of the requested data and quality rating 226 may indicate a likelihood that the synthetic portion of data may successfully generalize the first portion of the requested data.

The synthetic portion of the data (e.g., generated via inference generation 212 process) may be beneficial to the requestor depending on the quality of the synthetic portion of the data. To identify whether the synthetic portion of the data (e.g., synthetic data 216) should be provided to the requestor (e.g., when portion(s) of requested data are inaccessible), synthetic data 216 and quality rating 226 may be used in quality analysis 224 process. Quality analysis 224 process may include identifying, using the quality criteria (not shown), whether quality rating 226 indicates that the synthetic portion of data (e.g., synthetic data 216) is an acceptable substitute for the first portion of the requested data (e.g., the inaccessible portion of the requested data). During quality analysis 224, the system may determine whether the quality of the synthetic portion of the data (e.g., quality rating 226 for synthetic data 216) meets the quality criteria. The quality criteria may indicate a minimum quality rating for the synthetic portion(s) of the data (e.g., synthetic data 216) as specified, for example, by the requestor (e.g., downstream consumer 104). For example, the quality criteria may include a value or level of quality the synthetic portion of data must meet to increase the likelihood that accurate synthetic portion of the data may be provided to the requestor.

Quality analysis 224 process may be performed by obtaining synthetic data 216 and quality rating 226 from inference generation 212 process and making a comparison between the quality criteria and quality rating 226. Refer to FIGS. 2C and 2D for additional details regarding analyzing quality of the synthetic portion of the data.

Quality analysis 224 process may obtain a quantitative result (e.g., quality result 230) from performing the comparison between the quality criteria and quality rating 226 of synthetic data 216. Quality result 230 may indicate whether quality rating 226 meets the quality criteria. If quality rating 226 meets the quality criteria, then the system may determine that synthetic data 216 is an acceptable substitute of the first portion of the data (e.g., the inaccessible portion of data). As such, the system may include (e.g., provide) the synthetic portion of the data (e.g., synthetic data 216) in the data package (e.g., data package 222) during package generation process 218.

In some instances, the system may determine that quality rating 226 does not meet the quality criteria (e.g., synthetic portion of data is determined to not be an acceptable substitute for the inaccessible portion of data), the system may exclude (e.g., not provide) the synthetic portion of data (e.g., synthetic data 216) from the data package (e.g., data package 222) during package generation process 218.

The system may perform package generation process 218 to generate a data package (e.g., data package 222) to provide portion(s) of requested data to the requestor (e.g., downstream consumers 104) to service the request for data (e.g., request for data 202). Package generation process 218 may generate data package 222 including the synthetic portion of the data (e.g., as determined via quality analysis 224 process described above) and/or the second portion of the requested data (e.g., accessible portion of data as identified by request evaluation process 206).

During package generation process 218, managed data 220 may be obtained. Managed data 220 may include data obtained from one or more data sources (e.g., similar to any of data sources 100 shown in FIG. 1) and stored in a data repository (not shown) managed by data manager 102 (shown in FIG. 1). Continuing the above example, portions of data regarding an individual or entity (e.g., name, location, browsing history, area of interest, etc.) may be collected from the individual and/or entity (e.g., personal electronic device, desktop computer, etc.) and may be stored in a data repository (e.g., managed by data manager 102). The collected data may include multiple types of data such as personal data, purchase history, and/or any other data relating to an individual and/or entity (e.g., managed data 220).

Package generation process 218 may include obtaining portion(s) of data responsive to the data request (e.g., request for data 202) using managed data 220. During package generation process 218, the system may use an identifier for the second portion of the requested data (e.g., the accessible or unscreened data) to obtain the second portion of the requested data from managed data 220. Package generation process 218 may include performing a look up process using an identifier for the second portion of the requested data (e.g., received via request evaluation process 206). During package generation process 218, managed data 220 may be parsed or otherwise processed to obtain the second portion of the requested data. For example, during package generation process, the characteristic (e.g., an identifier) associated with the second portion of the requested data may be used as a key to perform a look up process to identify the second portion of the requested data.

Once generated, data package 222 may be provided and/or obtained by package analysis 228 process. Package analysis 228 process may use data package 222 and quality result 230 to obtain annotated package 232. Package analysis 228 process may include generating a notification to the requestor regarding the information and/or data included in data package 222. During package analysis 228 process, data package 222 and quality result 230 may be processed and/or analyzed to determine the information to include in the notification to the requestor. The notification may specify the data that is being provided to the requestor and the notification may be provided, attached, and/or otherwise included with the data package provided to the requestor. The notification may indicate to the requestor whether the requested data is being provided, if synthetic portion of the requested data is being provided, and/or any other information regarding the data included in data package 222. For example, if data package 222 includes synthetic data 216 (e.g., as determined via quality analysis 224 process), then a notification to the requestor may indicate the first portion of the data has not been provided and has been substituted with a synthetic portion of the data (e.g., synthetic data 216).

Once package analysis 228 process is performed, annotated package 232 may be provided to the requestor (e.g., downstream consumer 104). Annotated package 232 may include the notification (e.g., as specified by package analysis 228 process) and data package 222 (e.g., generated via package generation process 218).

Turning to FIG. 2B, a second data flow diagram illustrating data flows during a process of analyzing downstream use of inaccessible data in accordance with an embodiment is shown.

As discussed previously in FIG. 2A, the system may determine whether generating and providing a synthetic portion of data as a substitute for the first portion of the requested data (e.g., the inaccessible portion of the requested data as identified via request evaluation process 206) would be beneficial to the requestor to provide computer-implemented services. For example, during request evaluation process 206, portions of the data responsive to the data request (e.g., request for data 202 shown in FIG. 2A) may not be accessible, which may cause a break in communication of the data pipeline, for example, between the requestor (e.g., downstream consumer 104) and a data source (e.g., data sources 100).

Continuing with the discussion from FIG. 2A, if the list of identifiers for the data requested (e.g., as specified by data identification process 204 shown in FIG. 2A) includes an identifier for data that is subject to a regulation or limitation for disclosure during request evaluation process 206 (e.g., data identified via regulation information 208), downstream use analysis 210 process may be initiated. To initiate downstream use analysis 210 process, requestor identification 234 and denied data 236 may be used for data reliance analysis 238 process. Requestor identification 234 may include identifiers for the individual or entity and/or any other information associated with the requestor (e.g., the requestor's area of services, intended use of the requested data, etc.). Requestor identification 234 may also include identifiers for the requested data, sensitivity criteria for the requested data, and/or other information associated with the requested data. The sensitivity criteria for the requested data may indicate a degree to which the requestor relies on the requested data in order to perform computer-implemented services.

Denied data 236 may include identifiers for the first portion of the requested data (e.g., inaccessible or screened portion of the requested data) and/or any other information associated with the first portion of the requested data. For example, denied data 236 may indicate the type of data that was screened from the requestor (e.g., determined to be inaccessible via request evaluation process 206) such as personal identification data (e.g., a resident's full name, residential address, social security, etc.). During data reliance analysis 238 process, the system may make a comparison, using the information provided by requestor identification 234 and denied data 236, to determine whether the intended use (by the requestor) of the first portion of the requested data (e.g., inaccessible portion of the requested data) meets the sensitivity criteria (e.g., as specified by the requestor). The intended use of the first portion of the requested data may indicate various degrees in which the requestor relies on the first portion of the requested data to provide computer-implemented services. The sensitivity criteria may include a threshold of an acceptable degree of reliance for the first portion of the requested data by the requestor. In some instances, if reliance of the first portion of the requested data by the requestor is below the threshold (e.g., meets the sensitivity criteria), then the data flow may proceed to provide data for inference generation 240 action.

Continuing the above example, the company may rely on an individual's age to a certain degree of reliance to determine whether to market more generalized computing devices and/or peripheral devices (e.g., usable by a majority of individuals above a certain age) to individuals. The degree of reliance for an individual's age (e.g., the first portion of the requested data) may be compared to the threshold (e.g., sensitivity criteria) in order to determine whether the reliance of an individual's age by the requestor is below the threshold. If the degree of reliance for an individual's age is determined to be below the threshold (e.g., meets the sensitivity criteria), then generating a synthetic portion of the data to substitute for the first portion of the requested data may be beneficial to the company in order to market the company's products and/or services to individuals.

In some instances where the degree of reliance of the first portion of the requested data by the requestor is above the threshold (e.g., does not meet the sensitivity criteria), then the data flow may proceed to issue denial of access to data 242 action. For example, the company may rely more (e.g., in comparison to age) on area of occupation or area of interest for individuals or entities to determine whether to market specialized computing devices and/or peripheral devices such as high performing storage and/or memory devices, video projectors, etc., to individuals and/or entities. As such the degree of reliance for an individual and/or entity area of occupation and/or area of interest may be higher (e.g., in comparison to an individual's age) and therefore may exceed the threshold (e.g., sensitivity criteria). If the degree of reliance for the area of occupation or area of interest is determined to be above the threshold (e.g., does not meet the sensitivity criteria), then generating a synthetic portion of the data to substitute for the first portion of the requested data (e.g., the inaccessible portion of the requested data) may not beneficial to the company in order to market the company's products and/or services to individuals and/or entities.

Turning to FIG. 2C, a third data flow diagram illustrating data flows during quantification of synthetic data when data inaccessibility occurs by the system of FIG. 1 in accordance with an embodiment is shown.

As discussed previously in FIG. 2A, an inference model may be utilized to generate synthetic portion of the requested data (e.g., synthetic data 216) and a quality level or measure of quality (e.g., quality rating 226) associated with the synthetic portion of the requested data when a portion of the data responsive to the request is subject to a regulation or limitation for disclosure (e.g., via regulation information 208 shown in FIG. 2A).

Continuing with the discussion from FIG. 2A, the synthetic portion of the requested data (e.g., synthetic data 216) may include a generalization of the inaccessible portion of the requested data. A quality rating (e.g., quality rating 226) may also be obtained during the process of generating the synthetic portion of the data (e.g., inference generation 212 process) and the quality rating may indicate a likelihood that the synthetic portion of the requested data may successfully generalize the inaccessible portion of the requested data (e.g., quality rating 226).

To identify if synthetic data 216 should be provided to the requestor (e.g., when the requested data is unavailable), synthetic data 216, quality rating 226, and confidence classification 246 may be used in quantification of synthetic data 244 process. Confidence classification 246 may indicate a minimum acceptable level of certainty for the inference in order for the requestor to rely on the inference to make decisions and/or provide computer-implemented services. Confidence classification 246 may include different confidence classifications with various certainty levels associated with the respective inference (e.g., synthetic data 216), the requestor (e.g., downstream consumer 104), and/or any other relevant information. Confidence classification 246 may be obtained, for example, by reading from storage. Quantification of synthetic data 244 process may include comparing both the synthetic data 216 and quality rating 226 (e.g., associated with synthetic data 216) to confidence classification 246 to determine whether the inference (e.g., synthetic data 216) should be provided to the requestor (e.g., downstream consumers 104).

For example, quantification of synthetic data 244 process may be performed by comparing quality rating 226 of the synthetic portion of the requested data (e.g., synthetic data 216) to confidence classification 246. If the comparison indicates the inference does not at least meet the minimum level of certainty (e.g., synthetic data does not meet criteria 250 decision), then the data flow may proceed to issue denial of data availability 254 action. Issue denial of data availability 254 action may include generating a quality result (e.g., quality result 230 as shown in FIG. 2A) that indicates that the quality of the synthetic portion of the requested data is insufficient based on criteria as specified by the requestor (e.g., confidence classification 246) and that the synthetic portion of the requested data (e.g., synthetic data 216) should be excluded from the data package (e.g., during package generation process 218) to provide to the requestor (e.g., downstream consumers 104).

In contrast, if the comparison indicates the inference does meet or exceed the minimum level of certainty (e.g., synthetic data meets criteria 248 decision), then the data flow may proceed to provide synthetic data 252 action. Provide synthetic data 252 action may include generating a quality result (e.g., quality result 230 as shown in FIG. 2A) that indicates that the quality of the synthetic portion of the requested data is sufficient based on criteria as specified by the requestor (e.g., confidence classification 246) and that the synthetic portion of the requested data (e.g., synthetic data 216) should be included in the data package (e.g., during package generation process 218) to provide to the requestor (e.g., downstream consumers 104).

In addition, providing synthetic data 252 action may include: (i) inputting synthetic data 216 into the data pipeline, (ii) obtaining an output (e.g., generated by an inference model associated with the data pipeline) based on synthetic data 216, (iii) providing the output to the requestor (e.g., downstream consumer 104) via wireless communication system, and/or any other methods. For example, synthetic data 216 may be used as input for an artificial intelligence (AI) model used by the data pipeline and output from AI model (e.g., result from AI operation based on the input) may be provided to the requestor (e.g., downstream consumers 104).

Turning to FIG. 2D, a fourth data flow diagram illustrating data flows during verification of synthetic data when data inaccessibility occurs by the system of FIG. 1 in accordance with an embodiment is shown.

As discussed previously in FIG. 2A, an inference model may be utilized to generate synthetic portion of the requested data (e.g., synthetic data 216) when a portion of the data responsive to the request is subject to a regulation or limitation for disclosure (e.g., via regulation information 208 shown in FIG. 2A). In some instances, the user or individual for which the data is being generated for (e.g., the requestor) may indicate a minimum acceptable level of quality for the inference in order for the requestor to rely on the inference to make decisions and/or provide computer-implemented services. As such, verification of the synthetic portion of the requested data may be useful to the requestor in order to provide more accurate synthetic portion of the data based on the requestor's desired level of quality.

Continuing with the discussion from FIG. 2A, the synthetic portion of the requested data (e.g., synthetic data 216) may include a generalization of the inaccessible portion of the requested data. A quality rating (e.g., quality rating 226) may indicate a likelihood that the synthetic portion of the requested data may successfully generalize the inaccessible portion of the requested data. To identify if synthetic data 216 should be provided to the requestor (e.g., when the requested data is unavailable), synthetic data 216, quality rating 226, and user quality criteria 258 may be used in verification of synthetic data 256 process. User quality criteria 258 may indicate a minimum level of quality that the synthetic portion of the data must meet in order for the requestor to rely on the synthetic portion of the data to provide computer-implemented services. User quality criteria 258 may be obtained from the requested data (e.g., request for data 202) provided by the requestor (e.g., downstream consumer 104). Verification of synthetic data 256 process may include comparing both the synthetic data 216 and quality rating 226 (e.g., associated with synthetic data 216) to user quality criteria 258 to determine whether the inference (e.g., synthetic data 216) should be provided to the requestor (e.g., downstream consumers 104).

For example, verification of synthetic data 256 process may be performed by comparing quality rating 226 of the synthetic portion of the requested data (e.g., synthetic data 216) to user quality criteria 258. If the comparison indicates the inference does not at least meet the minimum level of quality (e.g., synthetic data does not meet criteria 260 decision), then the data flow may proceed to issue denial of data availability 266 action. Issue denial of data availability 266 action may include generating a quality result (e.g., quality result 230 as shown in FIG. 2A) that indicates that the quality of the synthetic portion of the requested data is insufficient based on criteria as specified by the requestor (e.g., user quality criteria 258) and that the synthetic portion of the requested data (e.g., synthetic data 216) should be excluded from the data package (e.g., during package generation process 218) to provide to the requestor (e.g., downstream consumers 104).

In contrast, if the comparison indicates the inference does meet or exceed the minimum level of quality (e.g., synthetic data meets criteria 262 decision), then the data flow may proceed to provide synthetic data 264 action. Provide synthetic data 264 action may include generating a quality result (e.g., quality result 230 as shown in FIG. 2A) that indicates that the quality of the synthetic portion of the requested data is sufficient based on criteria as specified by the requestor (e.g., user quality criteria 258) and that the synthetic portion of the requested data (e.g., synthetic data 216) should be included in the data package (e.g., during package generation process 218) to provide to the requestor (e.g., downstream consumers 104).

Turning to FIG. 2E, a fifth data flow diagram illustrating data flows during generation of synthetic data when data inaccessibility occurs by the system of FIG. 1 in accordance with an embodiment is shown.

As discussed previously in FIG. 2A, an inference model may be utilized to generate one or more inferences (e.g., synthetic data 216) when a portion of the data responsive to the request is not accessible and the intended use of the inaccessible data is not heavily relied on to provide computer-implemented services. For example, during request evaluation process 206, portions of the data responsive to the data request (e.g., request for data 202 shown in FIG. 2A) may not be accessible and during downstream use analysis 210 process, the intended use of the inaccessible portions of the data responsive to the data request may not be heavily relied on by the requestor when providing computer-implemented services.

Continuing with the discussion from FIG. 2A, if the list of identifiers for the data requested (e.g., as specified by data identification process 204 shown in FIG. 2A) includes an identifier for data that is subject to a regulation or limitation for disclosure during request evaluation process 206 (e.g., data identified via regulation information 208), and if the intended use of the first portion of the requested data (e.g., inaccessible portion of the requested data) meets the sensitivity criteria during downstream use analysis 210, inference generation 212 process may be initiated. To initiate inference generation 212 process, data requested 270 may be used for inference model selection process 272. Data requested 270 may include identifiers for the requested data and/or other information associated with the requested data (e.g., other known parameters such as the second portions of data, a period of time, and/or other portion of data available). For example, data requested 270 may include a request for electricity usage, payment history for electricity services, and residential addresses for residents for a specific period of time.

Inference model selection process 272 may analyze data requested 270 (e.g., identifiers for the data) to determine which inference model should be selected to generate the inference (e.g., synthetic data 216). Inference model selection process 272 may include performing a look up using inference model repository 274 to identify an inference model capable of generating an inference based on the specific type of data requested.

Inference model repository 274 may store any number of inference models (e.g., including inference model 214). Each of the inference models stored in inference model repository 274 may be trained to generate inferences generalizing a portion of data based on another known parameter (e.g., such as the second portion of data). Inference model selection process 272 may include determining that inference model 214 is usable based on data requested 270.

Continuing the above example, inference model 214 may be trained to generalize and/or predict an individual's age and/or age range based on historic data (e.g., previously recorded data) for individuals with similar parameters (e.g., area of occupation, area of educational studies, location, browsing history, etc.) obtained through the data pipeline (e.g., via data sources 100).

Once inference model 214 is obtained from inference model repository 274, inference model selection process 272 may also include obtaining identified parameter 276 from data requested 270. Identified parameter 276 may include a parameter associated with the predicted data (e.g., a second portion of the data, a period of time, etc.). In order to generate the inference (e.g., synthetic data 216) and a quality rating for the inference (e.g., quality rating 226), inference generation process 212 may utilize inference model 214 (and/or any other inference model selected by inference model selection process 272) and identified parameter 276. During inference generation process 212, denied data 278 and identified parameter 276 may be fed into inference model 214 in order to obtain an inference model result (e.g., synthetic data 216 and quality rating 226).

Synthetic data 216 and quality rating 226 may be provided to another data process system in the data pipeline for additional processing or further computation. For example, synthetic data 216 and quality rating 226 may be utilized by data manger 102 to perform package generation process 218 and quality analysis 224 process. In addition, synthetic data 216 and quality rating 226 may be transmitted (e.g., via a wireless communication system) to the requestor (e.g., downstream consumer 104 and/or another data processing system). Synthetic data 216 may be utilized by downstream consumers 104 of the data in order to perform a task, make a decision, and/or perform any other action that may rely on the inference generated by the inference model. For example, synthetic data 216 may include generalized personal data such as age(s) and/or age range(s) for individuals in various areas of occupations and/or areas of educational studies useable by the company (e.g., downstream consumers 104) to provide or sell computing devices and/or peripheral devices.

In an embodiment, the one or more entities performing the operations shown in FIG. 2A-2E are implemented using a processor adapted to execute computing code stored on a persistent storage that when executed by the processor performs the functionality of the system of FIG. 1 discussed throughout this application. The processor may be a hardware processor including circuitry such as, for example, a central processing unit, a processing core, or a microcontroller. The processor may be other types of hardware devices for processing information without departing from embodiments disclosed herein.

Figure 3A:
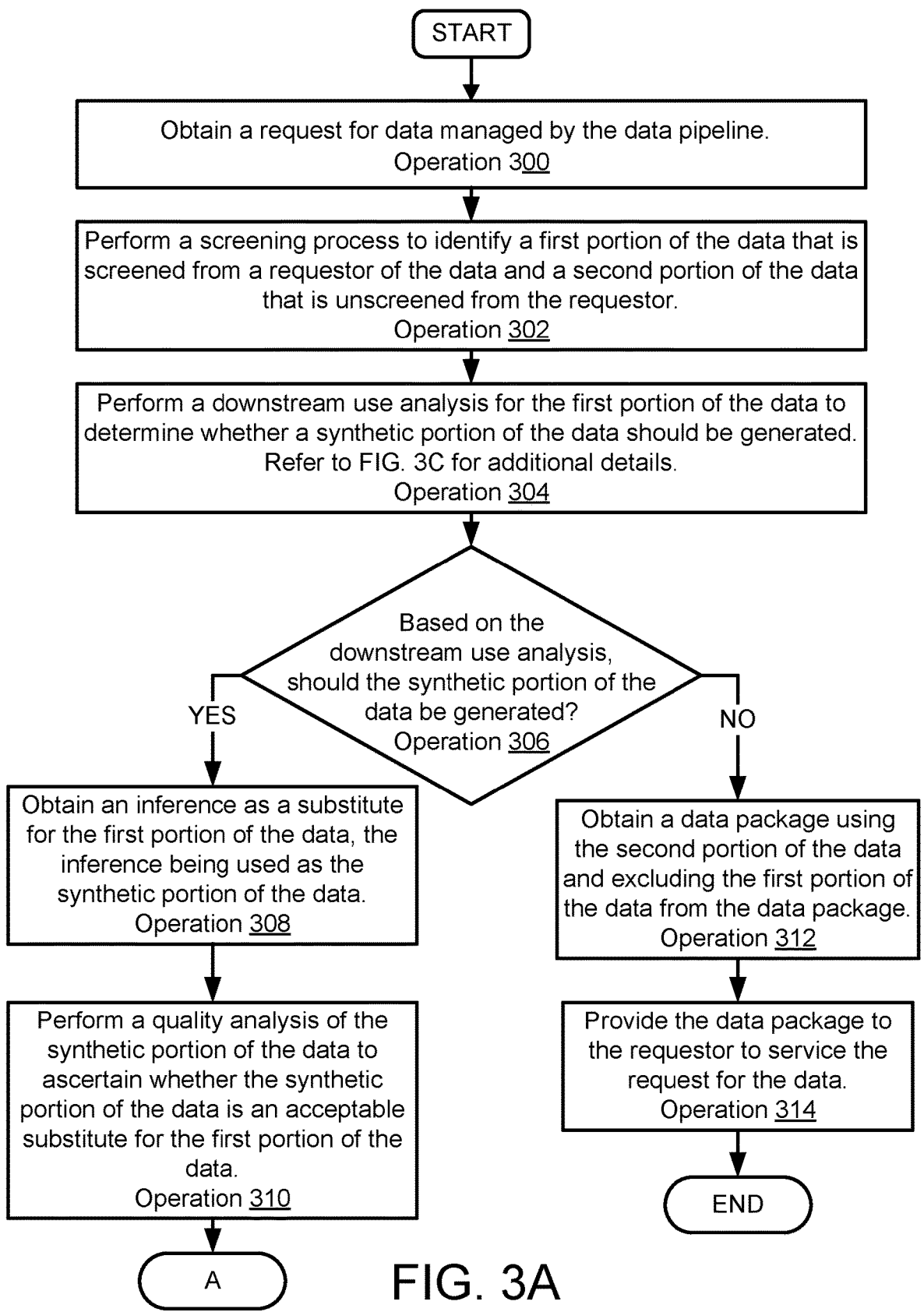
FIG. 3A-3B shows flow diagrams illustrating methods of managing operation of a data pipeline in accordance with an embodiment.
Figure 3B:
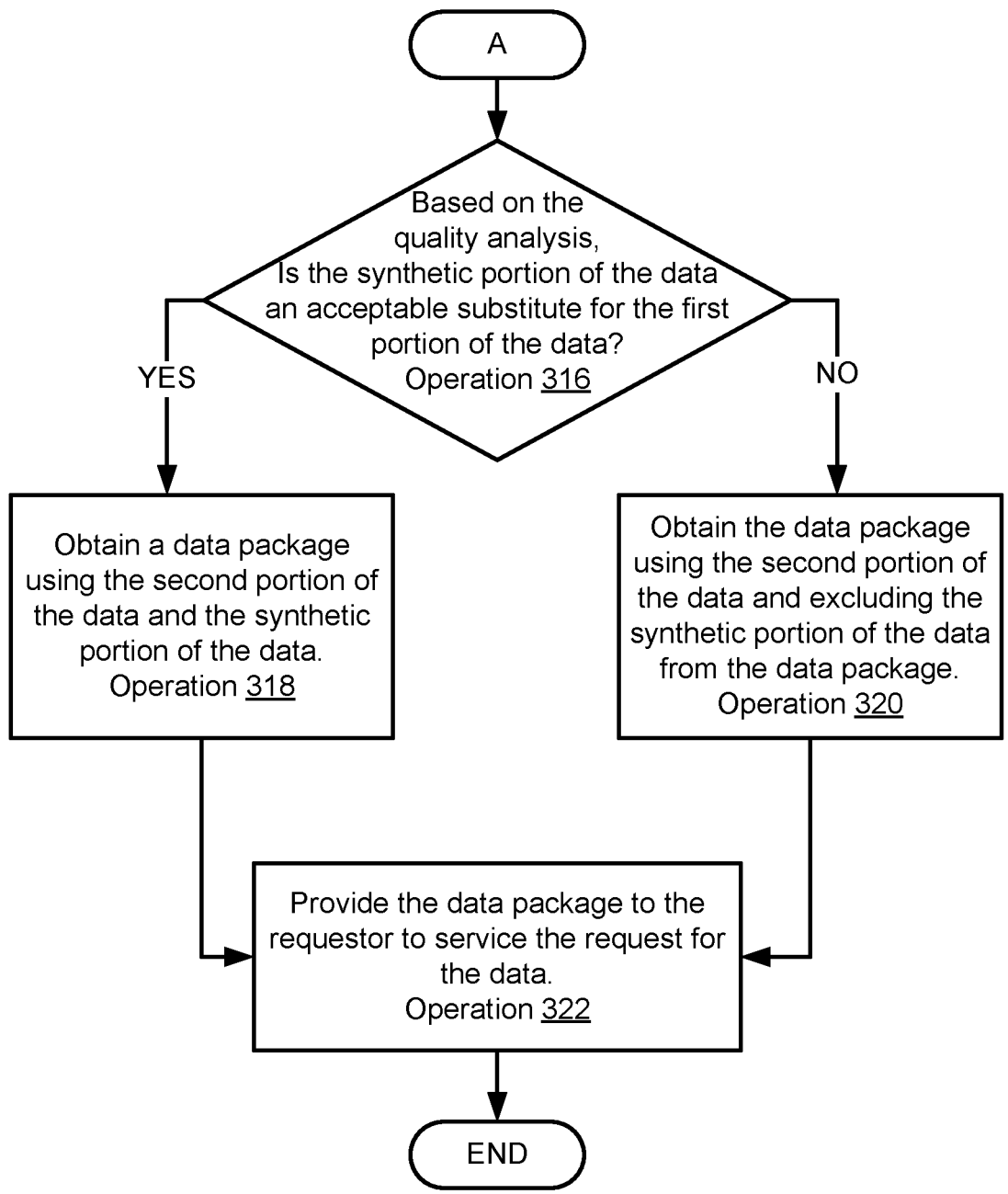
Figure 3C:
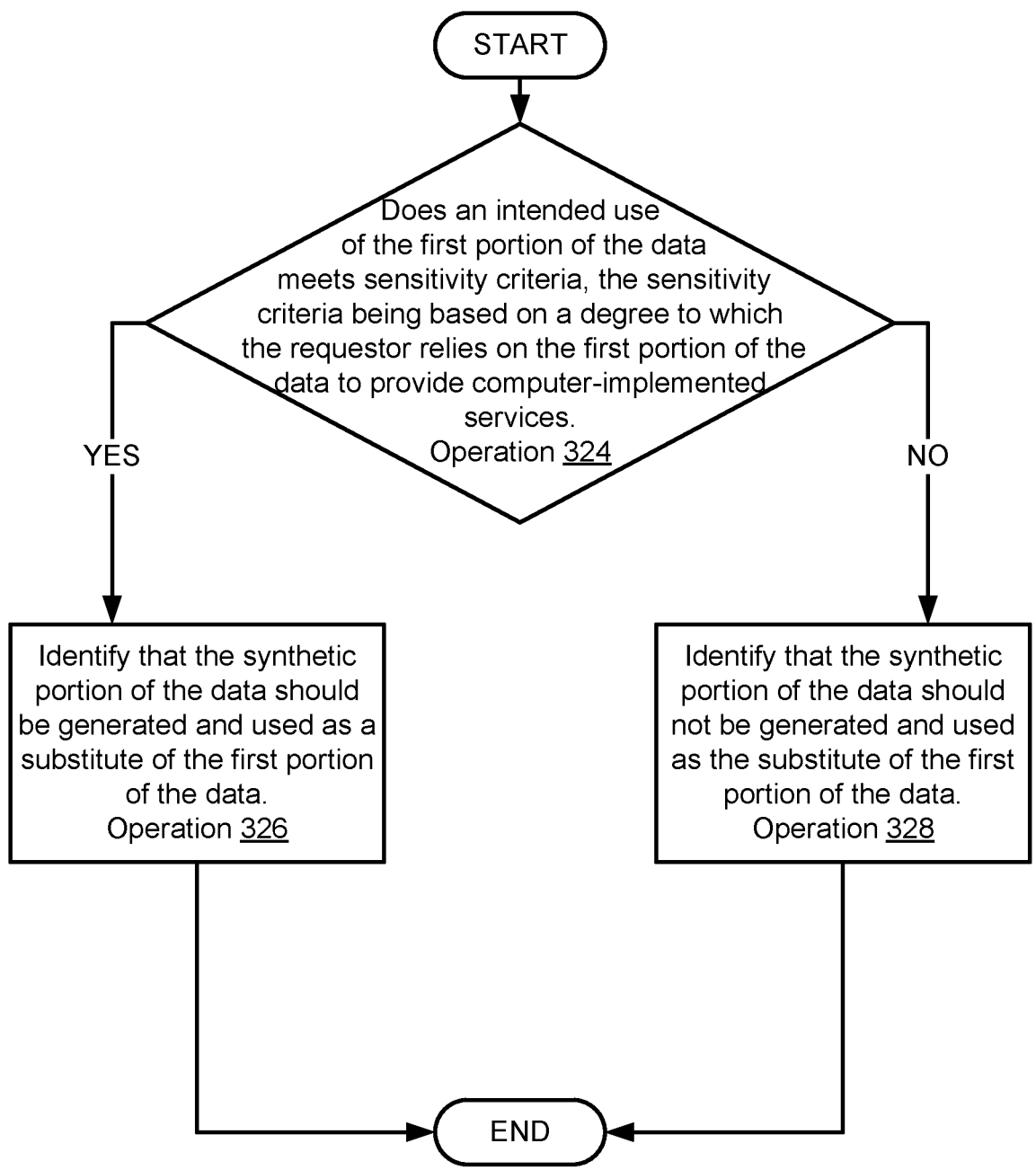
FIG. 3C shows a flow diagram illustrating methods of performing a downstream use analysis in accordance with an embodiment.

As discussed above, the components of FIG. 1 may perform various methods to manage operation of a data pipeline. FIGS. 3A-3C illustrate methods that may be performed by the components of the system of FIG. 1. In the diagram discussed below and shown in FIGS. 3A-3C, any of the operations may be repeated, performed in different orders, and/or performed in parallel with or in a partially overlapping in time manner with other operations.

Turning to FIG. 3A, a flow diagram illustrating a method for managing operation of a data pipeline in accordance with an embodiment is shown. The method may be performed by any of data sources 100, data manager 102, downstream consumers 104, and/or other entities without departing from embodiments disclosed herein.

At operation 300, a request for data managed by the data pipeline is obtained. The request for the data may be obtained by (i) receiving the request via a communication, (ii) by reading the request from storage, and/or any other method. For example, a data manager may receive a message (via a communication channel) from a downstream consumer indicating a time sensitive need for the data by the downstream consumer.

At operation 302, a screening process to identify a first portion of the data that is screened from a requestor of the data and a second portion of the data that is screened from the requestor may be performed. The screening process may be based on a data regulatory framework which may include data privacy regulations that discriminate the portions of the data with restricted access due to a sensitive nature of each of the portions of the data. The data privacy regulations may restrict access to the portions of the data identified in the screening process.

The screening process may be performed by: (i) identifying characteristic of the data (e.g., requested data), and (ii) comparing the characteristic of the data to the data regulatory framework to determine whether the data is subject to regulation or limitation for disclosure.

The characteristic of the data may be identified by (i) performing a lookup process using the requested data (and/or portions of the requested data) as a key for a data characteristic lookup table to identify one or more characteristics associated with (all of and/or any portions of) the requested data, (ii) receiving the characteristic of the data from the requestor (and/or other entity), (iii) ingesting the requested data into an inference model (trained to identify characteristics of data sets, and/or any other methods.

Comparing the characteristic of the data to the data regulatory framework may include (i) performing a lookup process, using the characteristic of the data as a key, to identify whether a characteristic of the data is subject to a regulation or limitation for disclosure (e.g., as specified by regulatory information), (ii) providing the characteristic and the data regulatory framework to another entity and receiving a notification in response (e.g., the notification indicating whether the characteristic of the data is subject to any data regulatory framework), (iii) and/or any other method.

Regulatory information may be obtained by (i) receiving a copy from an external device, (ii) reading from storage, and/or (iii) any other method or process. Portion(s) of the requested data that are identified as subject to a regulation or limitation (via regulatory information) may be identified as a first portion of the data and may be screened and/or restricted from being disclosed to a requestor (e.g., downstream consumer 104). Portion(s) of the requested data that are not identified as subject to a regulation or limitation (via regulatory information) may be identified as a second portion of the data and may be unscreened and/or accessible by the requestor (e.g., after a data package is generated as specified below).

At operation 304, a downstream use analysis for the first portion of the data may be performed to determine whether a synthetic portion of the data should be generated. Refer to FIG. 3C for additional details on performing the downstream use analysis for the first portion of the data.

At operation 306, a determination is made regarding whether the synthetic portion of the data should be generated based on the downstream use analysis is obtained. The determination may be based on the result of the downstream use analysis. For example, data manager may determine the synthetic portion of the data should be generated based on the downstream use analysis.

If it is determined that the synthetic portion of the data should be generated (e.g., the determination is "Yes" at operation 306), then the method may proceed to operation 308.

At operation 308, an inference as a substitute for the first portion of the data is obtained. The inference may be used as the synthetic portion of the data. The inference for the first portion of the data may be obtained by (i) receiving the inference from another device, (ii) reading the inference from storage, and/or (iii) via generation of the inference and a quality rating for the inference using an inference model and the second portion of the data.

Generating the inference and the quality rating for the inference may include: (i) obtaining an inference model, (ii) treating the second portion of the data (e.g., the accessible or unscreened portion of the data) as ingest for the inference model, and/or (iii) obtaining the inference and the quality rating as an output from the inference model.

Obtaining the inference model may include: (i) training the inference model using training data, (ii) acquiring the inference model from an external entity, and/or any other method. The trained inference model may have been trained to generate inferences to generalize data based on another parameter. The parameter may be selected from a list of parameters consisting of a point in time, a portion of other data managed by a data manager (e.g., second portion of the data), etc. The inference may not be usable by the requestor to discern the first portion of the data. For example, the requestor (e.g., downstream consumer 104) may not use the synthetic portion of the data (e.g., the inference) to identify the first portion of the data (e.g., the inaccessible or screened portion of the data).

At operation 310, a quality analysis of the synthetic portion of the data may be performed to ascertain whether the synthetic portion of the data is an acceptable substitute for the first portion of the data.

The quality analysis of the synthetic portion of the data may be performed by (i) obtaining quality criteria for the synthetic portion of the data, (ii) obtaining the synthetic portion of the data (including the quality rating associated with the synthetic portion of the data), and/or (iii) making a comparison between the quality criteria and the quality rating of the synthetic portion of the data. The quality criteria may indicate a minimum quality rating for the synthetic portion of the data and may be defined by the requestor (e.g., downstream consumer 104). The synthetic portion of the data may be considered an acceptable substitute for the first portion of the data when the quality rating (e.g., associated with the synthetic portion of the data) meets the quality criteria.

The quality criteria may be obtained by (i) receiving the quality criteria from the requestor (e.g., via wireless communication), (ii) reading from storage, (iii) and/or any other method.

Making the comparison between the quality criteria and the quality rating may be performed by (i) identifying a threshold for quality criteria, comparing a quantification of the quality indicated by the quality rating to the threshold, (ii) providing the quality criteria and the quality rating to another entity responsible for comparing the quality rating to the threshold, (iii) and/or any other method.

The method may continue to operation 316 as discussed in FIG. 3B.

Returning to operation 306, if it is determined that the synthetic portion of the data should not be generated (e.g., the determination is "No" at operation 306), then the method may proceed to operation 312.

At operation 312, a data package may be obtained using the second portion of the data and excluding the first portion of the data from the data package. The data package may be obtained by (i) generating the data package using the second portion of the data and excluding the synthetic portion of the data, (ii) receiving the data package from another source, and/or any other methods.

Generating the data package may include obtaining the second portion of the data and excluding the synthetic portion of the data from the data package. Obtaining the data package may include notifying the requestor that the first portion of the data has not been provided and that no acceptable substitute is available. Notifying the requestor may include (i) providing, via wireless communication, a message indicating the first portion of the data has not been provided and that no acceptable substitute is available, (ii) not providing the synthetic portion of the data to the requesting entity, and/or any other method.

Once the data package, using the second portion of the data and excluding the synthetic portion of the data, is obtained, then the method may proceed to operation 314.

At operation 314, the data package may be provided to the requestor to service the request for the data. The data package may be provided by (i) providing the data package to the requesting individual or entity via communication by a data processing system (e.g., in the form of a message, etc.), (ii) transmitting the data package to another entity responsible for providing the data package to the requesting individual or entity, (iii) by storing the data package in a databased and notifying the requesting individual or entity that the data package is available in the database, (iv) and/or any other methods. The method may end following operation 314.

Turning to FIG. 3B, a flow diagram illustrating a method for managing operation of a data pipeline in accordance with an embodiment is shown. The method may be performed by any of data sources 100, data manger 102, downstream consumers 104, and/or other entities without departing from embodiments disclosed herein.

Continuing the description of FIG. 3A, at operation 316, a determination is made, based on the quality analysis, whether the synthetic portion of the data is an acceptable substitute for the first portion of the data. If the synthetic portion of the data is an acceptable substitute for the first portion of the data (e.g., the determination is "Yes" at operation 316), then the method may proceed to operation 318.

At operation 318, a data package, using the second portion of the data and the synthetic portion of the data, may be obtained. The data package may be obtained by (i) generating the data package using the second portion of the data and the synthetic portion of the data, (ii) receiving the data package from another source, and/or (iii) any other methods. Generating the data package may include obtaining the second portion of the data and the synthetic portion of the data. The second portion of the data may be obtained by (i) receiving the second portion of data from another device, (ii) reading the second portion of data from storage, and/or (iii) any other method. and the synthetic portion of the data. The synthetic portion of the data may be obtained by (i) receiving the synthetic portion of the data from another device, (ii) reading the synthetic portion of the data from storage, and/or (iii) via generation of the synthetic portion of the data.

Obtaining the data package, using the second portion of the data and the synthetic portion of the data, may include notifying the requestor that the first portion of the data has not been provided and has been substituted with the synthetic portion of the data. Notifying the requestor may include (i) providing, via wireless communication, a message indicating the first portion of the data has not been provided and has been substituted with the synthetic portion of the data, (ii) providing the synthetic portion of the data to the requesting entity, and/or any other method.

Once the data package, using the second portion of the data and the synthetic portion of the data, is obtained, then the method may proceed to operation 322.

At operation 322, the data package may be provided to the requestor to service the request for the data. The data package may be provided by (i) providing the data package to the requesting individual or entity via communication by a data processing system (e.g., in the form of a message, etc.), (ii) transmitting the data package to another entity responsible for providing the data package to the requesting individual or entity, (iii) by storing the data package in a databased and notifying the requesting individual or entity that the data package is available in the database, (iv) and/or any other methods. The method may end following operation 322.

Returning to operation 316, if the synthetic portion of the data is determined to not be an acceptable substitute for the first portion of the data (e.g., the determination is "No" at operation 316), then the method may proceed to operation 320.

At operation 320, the data package may be obtained using the second portion of the data and excluding the synthetic portion of the data from the data package. The data package may be obtained by (i) generating the data package using the second portion of the data and excluding the synthetic portion of the data, (ii) receiving the data package from another source, and/or any other methods.

Generating the data package may include obtaining the second portion of the data and excluding the synthetic portion of the data from the data package. Obtaining the data package may include notifying the requestor that the first portion of the data has not been provided and that no acceptable substitute is available. Notifying the requestor may include (i) providing, via wireless communication, a message indicating the first portion of the data has not been provided and that no acceptable substitute is available, (ii) not providing the synthetic portion of the data to the requesting entity, and/or any other method.

Once the data package, using the second portion of the data and excluding the synthetic portion of the data, is obtained, then the method may proceed to operation 322, described above. The method may end following operation 322.

Turning to FIG. 3C, a flow diagram illustrating a method of establishing downstream use analysis in accordance with an embodiment is shown. The method may be performed by any of data sources 100, data manager 102, downstream consumers 104, and/or other entities without departing from embodiments disclosed herein. The operations shown in FIG. 3C may be an expansion of operation 304 in FIG. 3A.

Prior to operation 324, a data manager and/or another device may identify first portions of the data requested that may be screened (e.g., not accessible) from a requestor. A data manager or another device may determine whether generating synthetic portions of the data to substitute for the first portions of the data requested would be beneficial to the requestor to provide computer-implemented services.

At operation 324, a determination is made regarding whether an intended use of the first portion of the data meets sensitivity criteria. The determination may be made based on the sensitivity criteria, which may be a degree to which the requestor relies on the first portion of the data to provide computer-implemented services.

Downstream use analysis 210 may be performed by (i) identifying an intended use of the inaccessible portions of data (e.g., portions of data that are subject to regulation or limitation for disclosure), (ii) obtaining sensitivity criteria (e.g., degree of reliability by the requestor for the portion of data), and/or (iii) determining whether the intended use of the inaccessible portions of data meet the sensitivity criteria Refer to FIG. 2B for additional details regarding performing downstream use analysis.

If the intended use of the first portion of the data does meet sensitivity criteria (e.g., the determination is "Yes" at operation 324), then the method may proceed to operation 326.

At operation 326, an identification is made that the synthetic portion of the data should be generated and used as a substitute of the first portion of the data. Identifying the synthetic portion of the data should be generated and used as a substitute of the first portion of the data may include (i) providing an indication that the intended use of the first portion of the requested data meets the sensitivity criteria, (ii) providing instructions to another entity to proceed to obtain the inference, (iii) and/or any other method. The method may end following operation 328.

Returning to operation 324, if the intended use of the first portion of the data does not meet sensitivity criteria (e.g., the determination is "No" at operation 324), then the method may proceed to operation 328. At operation 328, an identification is made that the synthetic portion of the data should not be generated and used as the substitute of the first portion of the data. Identifying that the synthetic portion of the data should not be generated and used as the substitute of the first portion of the data may include (i) providing an indication that the intended use of the first portion of the requested data does not meet the sensitivity criteria, (ii) providing an indication that the synthetic portion of the data may not be generated (iii) and/or any other method. The method may end following operation 328.

Figure 4:
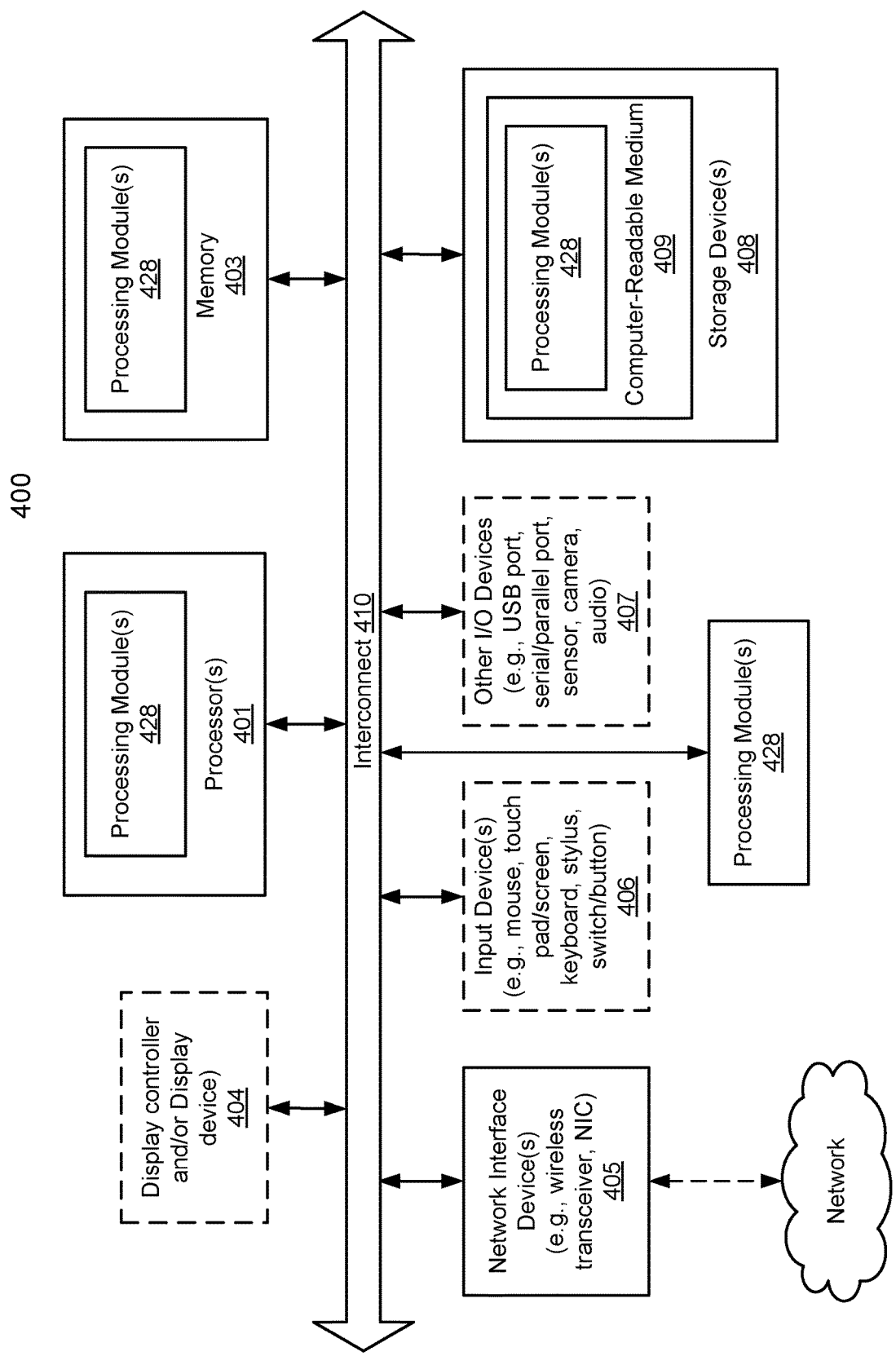
FIG. 4 shows a block diagram illustrating a data processing system in accordance with an embodiment.

Any of the components illustrated in FIGS. 1-3C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data pipeline, the method comprising:
   obtaining a request for data managed by the data pipeline;
   performing a screening process to identify a first portion of the data that is screened from a requestor of the data and a second portion of the data that is unscreened from the requestor;
   performing a downstream use analysis for the first portion of the data to determine whether a synthetic portion of the data should be generated;
   in a first instance of the downstream use analysis in which the synthetic portion of the data should be generated:
      obtaining an inference as a substitute for the first portion of the data, the inference being used as the synthetic portion of the data;
      performing a quality analysis of the synthetic portion of the data to ascertain whether the synthetic portion of the data is an acceptable substitute for the first portion of the data;
      in a first instance of the quality analysis where the synthetic portion of the data is the acceptable substitute for the first portion of the data:

obtaining a data package using the second portion of the data and the synthetic portion of the data;

in a second instance of the quality analysis where the synthetic portion of the data is not the acceptable substitute for the first portion of the data:

obtaining the data package using the second portion of the data and excluding the synthetic portion of the data from the data package; and providing the data package to the requestor to service the request for the data.

2. The method of claim 1, wherein the data being subject to a data regulatory framework, the data regulatory framework indicating portions of the data that are restricted from being disclosed.

3. The method of claim 2, wherein the screening process is based on the data regulatory framework which comprises data privacy regulations that discriminate the portions of the data with restricted access due to a sensitive nature of each of the portions of the data, the data privacy regulations restricting access to the portions of the data.

4. The method of claim 1, wherein the first portion of the data that is screened is inaccessible by the requestor, and the second portion of the data that is unscreened is accessible by the requestor after the data package is used to service the request.

5. The method of claim 2, wherein performing the screening process comprises:

identifying characteristic of the data; and comparing the characteristic of the data to the data regulatory framework to determine whether the data is subject to regulation or limitation for disclosure.

6. The method of claim 1, wherein performing the downstream use analysis comprises:

making a determination regarding whether an intended use of the first portion of the data meets sensitivity criteria, the sensitivity criteria being based on a degree to which the requestor relies on the first portion of the data to provide computer-implemented services;

in a first instance of the determination in which the intended use of the first portion of the data meets the sensitivity criteria:

identifying that the synthetic portion of the data should be generated and used as a substitute of the first portion of the data; and in a second instance of the determination in which the intended use of the second portion of the data does not meet the sensitivity criteria:

identifying that the synthetic portion of the data should not be generated and used as the substitute of the first portion of the data.

7. The method of claim 1, wherein obtaining the inference comprises:

generating, using an inference model and the second portion of the data, an inference and a quality rating for the inference, the inference being a generalization for the first portion of the data, and the quality rating indicating a likelihood that the inference accurately generalizes the first portion of the data.

8. The method of claim 7, wherein the inference is not usable by the requestor to discern the first portion of the data.

9. The method of claim 8, wherein performing the quality analysis comprises:

obtaining quality criteria for the synthetic portion of the data, the quality criteria indicating a minimum quality rating for the synthetic portion of the data; and making a comparison between the quality criteria and the quality rating of the synthetic portion of the data, wherein the quality criteria are defined by the requestor and the synthetic portion of the data is considered the acceptable substitute of the first portion of the data when the quality rating meets the quality criteria.

10. The method of claim 1, wherein in the first instance of the quality analysis where the synthetic portion of the data is the acceptable substitute for the first portion of the data: obtaining the data package comprises:

notifying the requestor that the first portion of the data has not been provided and has been substituted with the synthetic portion of the data.

11. The method of claim 10, wherein in the second instance of the quality analysis where the synthetic portion of the data is not the acceptable substitute for the first portion of the data: obtaining the data package comprises:

notifying the requestor that the first portion of the data has not been provided and that no acceptable substitute is available.

12. The method of claim 1, further comprising:

in a second instance of the downstream use analysis in which the synthetic portion of the data should not be generated:

obtaining the data package using the second portion of the data and excluding the first portion of the data from the data package; and providing the data package to the requestor to service the request for the data.

13. A non-transitory machine-readable medium having instructions stored therein, which when executed by a processor, cause the processor to perform operations for managing operation of a data pipeline, the operations comprising:

obtaining a request for data managed by the data pipeline;

performing a screening process to identify a first portion of the data that is screened from a requestor of the data and a second portion of the data that is unscreened from the requestor;

performing a downstream use analysis for the first portion of the data to determine whether a synthetic portion of data should be generated;

in a first instance of the downstream use analysis in which the synthetic portion of the data should be generated:

obtaining an inference as a substitute for the first portion of the data, the inference being used as the synthetic portion of the data;

performing a quality analysis of the synthetic portion of the data to ascertain whether the synthetic portion of the data is an acceptable substitute for the first portion of the data;

in a first instance of the quality analysis where the synthetic portion of the data is an acceptable substitute for the first portion of the data:

obtaining a data package using the second portion of the data and the synthetic portion of the data;

in a second instance of the quality analysis where the synthetic portion of the data is not the acceptable substitute for the first portion of the data:

obtaining the data package using the second portion of the data and excluding the synthetic portion of the data from the data package; and providing the data package to the requestor to service the request for the data.

14. The non-transitory machine-readable medium of claim 13, wherein the data being subject to a data regulatory framework, the data regulatory framework indicating portions of the data that are restricted from being disclosed.

15. The non-transitory machine-readable medium of claim 14, wherein the screening process is based on the data regulatory framework which comprises data privacy regulations that discriminate the portions of the data with restricted access due to a sensitive nature of each of the portions of the data, the data privacy regulations restricting access to the portions of the data.

16. The non-transitory machine-readable medium of claim 13, wherein the first portion of the data that is screened is inaccessible by the requestor, and the second portion of the data that is unscreened is accessible by the requestor after the data package is used to service the request.

17. The non-transitory machine-readable medium of claim 14, wherein performing the screening process comprises:
    identifying characteristic of the data; and
    comparing the characteristic of the data to the data regulatory framework to determine whether the data is subject to regulation or limitation for disclosure.

18. A data processing system, comprising:
    a processor; and
    a memory coupled to the processor to store instructions, which when executed by the processor, cause the processor to perform operations for managing operation of a data pipeline, the operations comprising:
        obtaining a request for data managed by the data pipeline;
        performing a screening process to identify a first portion of the data that is screened from a requestor of the data and a second portion of the data that is unscreened from the requestor;
        performing a downstream use analysis for the first portion of the data to determine whether a synthetic portion of data should be generated;
        in a first instance of the downstream use analysis in which the synthetic portion of data should be generated:
            obtaining an inference as a substitute for the first portion of the data, the inference being used as the synthetic portion of the data;
            performing a quality analysis of the synthetic portion of the data to ascertain whether the synthetic portion of the data is an acceptable substitute for the first portion of the data;
            in a first instance of the quality analysis where the synthetic portion of the data is an acceptable substitute for the first portion of the data:
                obtaining a data package using the second portion of the data and the synthetic portion of the data;
            in a second instance of the quality analysis where the synthetic portion of the data is not the acceptable substitute for the first portion of the data:
                obtaining the data package using the second portion of the data and excluding the synthetic portion of the data from the data package; and
        providing the data package to the requestor to service the request for the data.

19. The data processing system of claim 18, wherein the data being subject to a data regulatory framework, the data regulatory framework indicating portions of the data that are restricted from being disclosed.

20. The data processing system of claim 19, wherein the screening process is based on the data regulatory framework which comprises data privacy regulations that discriminate the portions of the data with restricted access due to a sensitive nature of each of the portions of the data, the data privacy regulations restricting access to the portions of the data.

* * * * *